United States Patent
Shuman et al.

(10) Patent No.: US 12,432,536 B2
(45) Date of Patent: Sep. 30, 2025

(54) OPTIMIZED VEHICLE-TO-EVERYTHING (V2X) MESSAGING

(71) Applicant: QUALCOMM Incorporated, San Diego, CA (US)

(72) Inventors: Mohammed Ataur Rahman Shuman, San Diego, CA (US); Soumya Das, San Diego, CA (US); Mohammad Nekoui, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 17/731,128

(22) Filed: Apr. 27, 2022

(65) Prior Publication Data
US 2023/0354002 A1    Nov. 2, 2023

(51) Int. Cl.
| | | |
|---|---|---|
| *H04W 4/90* | (2018.01) | |
| *H04W 4/12* | (2009.01) | |
| *H04W 4/40* | (2018.01) | |
| *H04W 92/18* | (2009.01) | |

(52) U.S. Cl.
CPC ............. *H04W 4/90* (2018.02); *H04W 4/12* (2013.01); *H04W 4/40* (2018.02); *H04W 92/18* (2013.01)

(58) Field of Classification Search
None
See application file for complete search history.

(56) References Cited

U.S. PATENT DOCUMENTS

| | | | | |
|---|---|---|---|---|
| 2015/0264538 A1* | 9/2015 | Klang | ............... | H04W 4/12 455/457 |
| 2016/0227380 A1* | 8/2016 | Zhang | ............... | H04W 4/90 |
| 2019/0132709 A1* | 5/2019 | Graefe | ............... | G05D 1/028 |
| 2019/0208449 A1* | 7/2019 | Wang | ............... | H04W 36/322 |
| 2019/0215695 A1* | 7/2019 | Yang | ............... | H04L 9/3271 |
| 2019/0251848 A1* | 8/2019 | Sivanesan | ............... | H04W 4/08 |
| 2020/0028736 A1* | 1/2020 | Park | ............... | H04W 72/23 |
| 2020/0336870 A1* | 10/2020 | Back | ............... | H04W 40/244 |
| 2020/0372795 A1* | 11/2020 | Szilagyi | ............... | H04W 4/44 |
| 2021/0009161 A1* | 1/2021 | Kim | ............... | H04W 4/40 |

(Continued)

FOREIGN PATENT DOCUMENTS

WO    2020256238 A1    12/2020

OTHER PUBLICATIONS

International Search Report and Written Opinion—PCT/US2023/064832—ISA/EPO—Jun. 30, 2023.

*Primary Examiner* — Otis L Thompson, Jr.
(74) *Attorney, Agent, or Firm* — Polsinelli

(57) ABSTRACT

Systems and techniques are described for providing optimized vehicle-to-everything (V2X) safety messages over a wide area network (Uu) interface. For example, method for wireless communications may include receiving, by a network device, one or more first messages from one or more vehicles. Each of the first message(s) includes vehicle information associated with a respective vehicle of the vehicle(s). The method may include determining, at the network device, one or more recipient vehicles for one or more second messages based on at least a portion of the vehicle information from the first message(s) and characteristics associated with a respective recipient vehicle of the recipient vehicle(s). The method may include transmitting, at the network device, the second message(s) to the recipient vehicle(s).

47 Claims, 20 Drawing Sheets

(56) References Cited

U.S. PATENT DOCUMENTS

| | | | |
|---|---|---|---|
| 2021/0153099 A1* | 5/2021 | Back | H04W 40/22 |
| 2021/0266822 A1* | 8/2021 | Atarius | H04L 67/12 |
| 2021/0312806 A1 | 10/2021 | Kulakov | |
| 2022/0030430 A1* | 1/2022 | Lund | H04W 12/033 |
| 2022/0292971 A1* | 9/2022 | Park | G06V 20/586 |

* cited by examiner

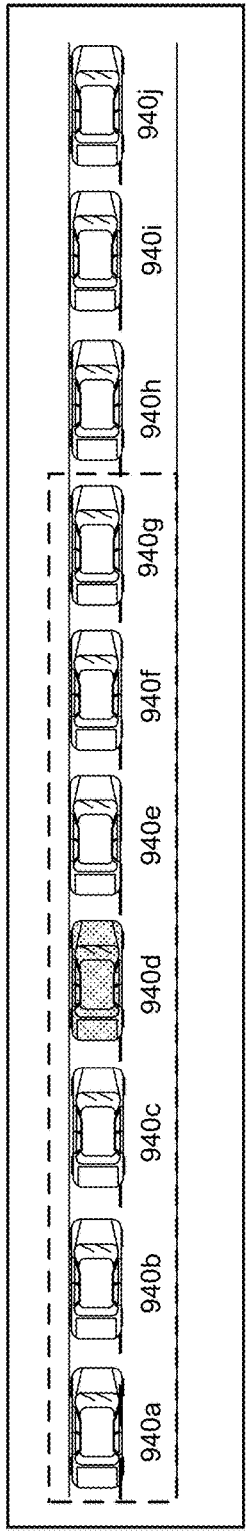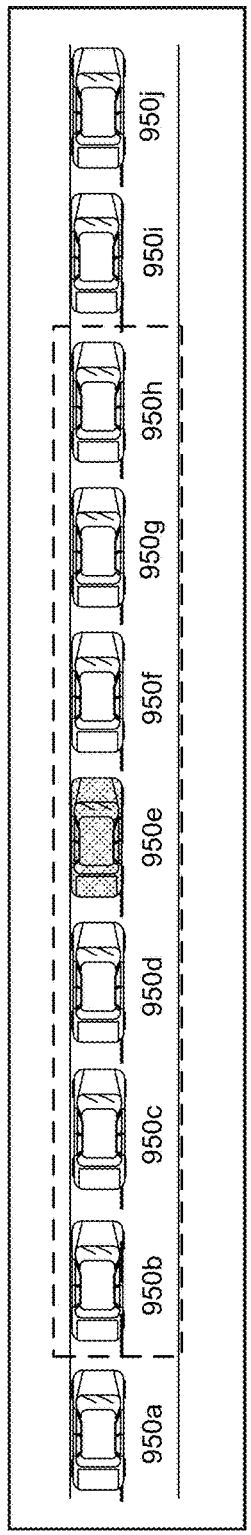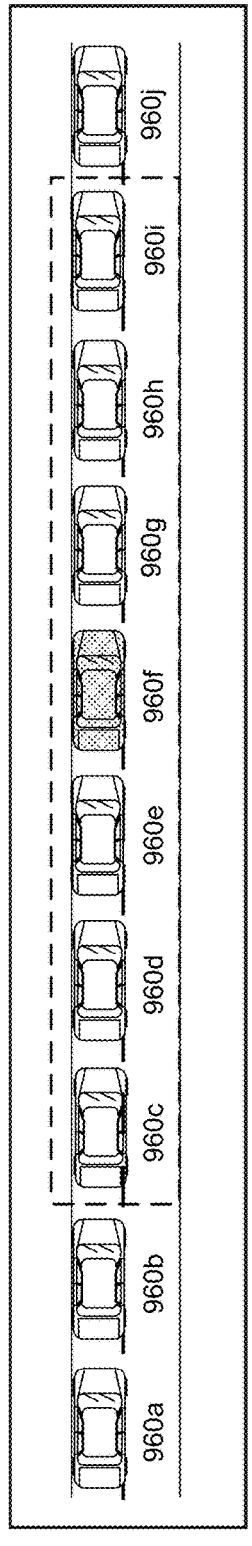
FIG. 9B

OPTIMIZED VEHICLE-TO-EVERYTHING (V2X) MESSAGING

FIELD

The present disclosure relates generally to network communications. For example, aspects of the present disclosure relate to providing optimized vehicle-to-everything (V2X) messaging.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise communications between devices, such as in V2X, vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for providing optimized messaging, such as over a wide area network (e.g., Uu) interface. According to at least one example, a method for wireless communications at a network device includes: receiving, at the network device, one or more first messages from one or more vehicles remote from the network device, wherein each of the one or more first messages comprises vehicle information associated with a respective vehicle of the one or more vehicles: determining, at the network device, one or more recipient vehicles for one or more second messages based on at least a portion of the vehicle information from the one or more first messages and characteristics associated with a respective recipient vehicle of the one or more recipient vehicles, the one or more recipient vehicles being remote from the network device; and transmitting, at the network device, the one or more second messages to the one or more recipient vehicles.

In another example, an apparatus for wireless communications is provided that includes at least one memory (e.g., configured to store data, such as virtual content data, one or more images, etc.) and at least one processor (e.g., implemented in circuitry) coupled to the at least one memory. The at least one processor is configured to and can: receive one or more first messages from one or more vehicles remote from the apparatus, wherein each of the one or more first messages comprises vehicle information associated with a respective vehicle of the one or more vehicles: determine one or more recipient vehicles for one or more second messages based on at least a portion of the vehicle information from the one or more first messages and characteristics associated with a respective recipient vehicle of the one or more recipient vehicles, the one or more recipient vehicles being remote from the apparatus; and output the one or more second messages for transmission to the one or more recipient vehicles.

In another example, a non-transitory computer-readable medium of a network device is provided that has stored thereon instructions that, when executed by one or more processors, cause the one or more processors to: receive one or more first messages from one or more vehicles remote from the network device, wherein each of the one or more first messages comprises vehicle information associated with a respective vehicle of the one or more vehicles: determine one or more recipient vehicles for one or more second messages based on at least a portion of the vehicle information from the one or more first messages and characteristics associated with a respective recipient vehicle of the one or more recipient vehicles, the one or more recipient vehicles being remote from the network device; and output the one or more second messages for transmission to the one or more recipient vehicles.

In another example, an apparatus for wireless communications is provided. The apparatus includes: means for receiving one or more first messages from one or more vehicles, wherein each of the one or more first messages comprises vehicle information associated with a respective vehicle of the one or more vehicles remote from the apparatus: means for determining one or more recipient vehicles for one or more second messages based on at least a portion of the vehicle information from the one or more first messages and characteristics associated with a respective recipient vehicle of the one or more recipient vehicles, the one or more recipient vehicles being remote from the apparatus; and means for transmitting the one or more second messages to the one or more recipient vehicles.

In some aspects, the apparatus is, or is part of, a network device (e.g., a multi-access edge computing (MEC) device, a gNodeB (gNB), an evolved NodeB (eNB), a location server such as a location management function (LMF), or a portion thereof) or by a component or system (e.g., a chipset) of the network device. In other cases, the apparatus may be, or may be part of, a vehicle (e.g., an automobile, truck, etc., or a component or system of an automobile, truck, etc.), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 9A and 9B are diagrams that illustrate example ranges for V2X enabled vehicles, in accordance with some aspects of the present disclosure.

DETAILED DESCRIPTION

Figure 1:
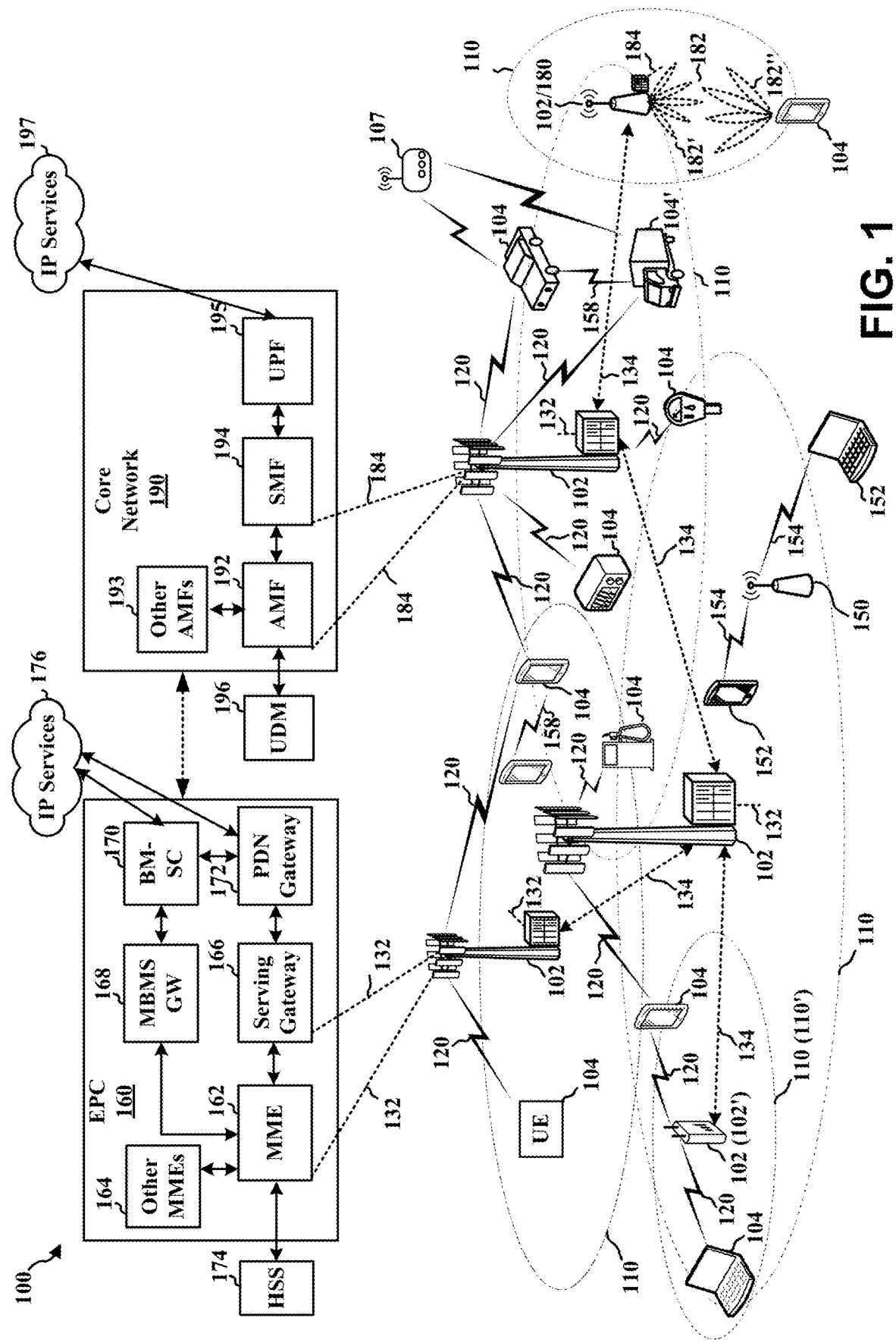
FIG. 1 is a diagram illustrating an example of a wireless communications system and an access network, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A 5G mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, and/or traffic infrastructure. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming road dangers (e.g., unforeseen oncoming vehicles, accidents, and road conditions) from the other vehicles.

The IEEE 802.11p Standard supports a dedicated short-range communications (DSRC) interface for V2X wireless communications. Characteristics of the IEEE 802.11p based DSRC interface include low latency and the use of the unlicensed 5.9 Gigahertz (GHz) frequency band. However, the IEEE 802.11p based DSRC interface has the disadvantage of having a short range (e.g., under approximately one (1) kilometer (km)).

Cellular V2X (C-V2X) was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band. The LTE C-V2X sidelink PC5 interface and the DSRC interface also have the disadvantage of having a short range (e.g., under approximately 1 km).

Since both the IEEE 802.11p based DSRC interface and the LTE C-V2X sidelink PC5 interface are range limited (e.g., by approximately 1 km), these wireless technologies have the disadvantage of not allowing the wireless exchange of information between vehicles that are located apart by more than the limited range (e.g., separated by 1 km or more in distance). In some cases, for example when at least one of the vehicles is traveling at a high speed, it may be necessary for the vehicles to receive information, such as a do not pass warning (DNPW), from one another at distances greater than 1 km in order to prevent a collision. As such, there is need for an improved V2X wireless technology that allows for a longer range of transmission of information.

Systems, apparatuses, processes (also referred to as methods), and computer-readable media (collectively referred to as "systems and techniques") are provided herein for optimizing vehicle situational awareness, such as awareness of upcoming road dangers (e.g., unforeseen oncoming vehicles, accidents, and road conditions), by effectively increasing the range of information exchange among vehicles. The systems and techniques provide the ability of vehicles or other devices (e.g., road side units (RSUs), pedestrian devices/UEs such as a mobile phone, network-connected infrastructure devices such as a network-connected traffic light, etc.) to receive informational messages from each other, even when the vehicles and/or other devices are located apart from one another by more than a limited range (e.g., greater than 1 km in distance from one other) of the V2X wireless technology used for V2X communications by the vehicles and/or other devices. The systems and techniques provide the ability of vehicles and/or other devices to be become aware of unforeseen potential road dangers that are not within their field of view, for example, due to obstructions (e.g., obstructing vehicles, structures, and/or objects) in their view. As such, the systems and techniques can provide a see-through capability to vehicles and/or other devices (e.g., in essence to "see through" obstructions by becoming aware of obstructed road dangers).

The disclosed systems and techniques employ the use of a network device to operate as an intelligent relay for the messages transmitted between the vehicles. The network device has the advantage of providing low latency along with a high range of transmission (e.g., a transmission range greater than 1 km). In some examples, a multi-access edge computing (MEC) device (e.g., a 5G MEC device) may be employed as the network device. In some cases, the network device (e.g., the MEC) may be co-located with a network entity, such as a cellular base station (e.g., a 3G, 4G, 5G, etc. base station such as a gNodeB (gNB), an evolved NodeB (eNB), etc.) or a portion of a cellular base station (e.g., one or more of a central unit (CU), a distributed unit (DU), a radio unit (RU), a Near-Real Time (Near-RT) RAN Intelligent Controller (RIC), or a Non-Real Time (Non-RT) RIC, described in more detail below). A wide area network (Uu) interface of the network entity (e.g., a base station or portion thereof) can be utilized as the air interface for transmission between the vehicles and the network device (e.g., the MEC). The range of the Uu interface is higher than the range of C-V2X and DSRC. For example, using the Uu interface, the network entity (e.g., a base station or portion thereof) can have a transmission range of at least several kilometers (kms).

In some aspects, the network device can receive one or more informational messages (e.g., a vehicular-based message) from one or more vehicles (e.g., a first informational message from a first vehicle, a second informational message from a second vehicle, etc.). An informational message from a vehicle may include information or characteristics related to the vehicle (e.g., a position of the vehicle, an accuracy of the position, a speed of the vehicle, a direction in which the vehicle is traveling, and/or other information related to the vehicle), traffic conditions (e.g., low speed and/or dense traffic, high speed traffic, information related to an accident, etc.), weather conditions (e.g., rain, snow; etc.), message type (e.g., an emergency message, a non-emergency or "regular" message), etc.), road topology (line-of-sight (LOS) or non-LOS (NLOS), etc.), any combination, thereof, and/or other information. In some examples, the informational message may also include information regarding the vehicle's preference to receive informational messages from other certain specific vehicles. In some cases, the informational message may include the current capabilities of the vehicle, such as the vehicle's processing capabilities, the vehicle's thermal status (which can affect the vehicle's ability to process data), and the vehicle's state of health. In some implementations, the informational message may include a specific use case or safety warning, such as a do-not-pass warning (DNPW) or a forward collision warning (FCW), related to the current conditions of vehicle. In some examples, an informational message may be in the form of a standard basic safety message (BSM), a cooperative awareness message (CAM), a sensor data sharing message (SDSM), and/or other format.

After the network device receives the one or more informational messages from the one or more vehicles, the network device can use the information contained within the informational message(s) along with other information (e.g., characteristics of other vehicles, location information associated with a location or scene of the other vehicles, weather conditions, traffic conditions, etc.) to determine which other vehicles and/or other devices (e.g., pedestrian devices/UEs such as a mobile phone, network-connected infrastructure devices such as a network-connected traffic light, etc.) currently located within a traffic system (including vehicles and other V2X-capable devices within a communication range of the network device) to transmit a response message (or multiple responses messages) containing information from the one or more vehicles from which the informational messages are received. The vehicles and/or other devices determined to receive the response message(s) are referred to herein as recipient vehicles or recipient devices. While examples are described herein using recipient vehicles as illustrative examples of devices determined to receive the response messages, the techniques described herein apply to other types of recipient devices (e.g., recipient RSUs, recipient pedestrian devices/UEs, recipient network-connected infrastructure devices, etc.).

In some aspects, a response message sent to a recipient vehicle or other device can include the informational message the network device received from a particular vehicle. For example, the network device can forward the informational message received from the vehicle to the recipient vehicle. In some examples, the other information used by the network entity to determine which other vehicles and/or other devices to which transmit a response message may include characteristics of other vehicles, location information associated with a location or scene of the other vehicles, current weather conditions, traffic conditions, lighting conditions (e.g., time of day lighting conditions), road topology conditions, obstruction conditions, any combination thereof, and/or other information related to some or all of the vehicles located within the traffic system. In some examples, the other information can include characteristics of a particular recipient vehicle, such as a quality of service (QOS) associated with the recipient vehicle, performance parameters (e.g., thermal characteristics or requirements of the recipient vehicle, processing capabilities of the recipient vehicle, a state of health of the recipient vehicle, etc.).

In some aspects, the network device can use the information contained within the informational message from the vehicle along with the other information (e.g., characteristics of other vehicles, location information associated with a location or scene of the other vehicles, weather conditions, traffic conditions, etc.) to generate a dynamic neighbor list (also referred to as a local dynamic map (LDM) or dynamic surrounding map) for each of the recipient vehicles. The dynamic neighbor list can also be referred to as a local dynamic map (LDM). For example, each dynamic neighbor list can include a listing of all of the vehicles that are located within a specific predetermined distance (or radius of distance) away from a corresponding recipient vehicle. In some cases, each dynamic neighbor list includes a mapping, which may include roads and terrain topology, of all of the vehicles that are located within a specific predetermined distance (or radius of distance) away from a corresponding recipient vehicle. In some examples, each recipient vehicle may use the information contained within the response message along with the other information (e.g., characteristics of other vehicles, location information associated with a location or scene of the other vehicles, weather conditions, traffic conditions, etc.) to generate the dynamic neighbor list for itself.

In some cases, the network device can use the information contained within an informational message from a vehicle, a QoS associated with each of the recipient vehicles, performance parameters of each of the recipient vehicles, and/or other information or characteristics described above, to determine which vehicles can be recipient vehicles to which to send one or more response messages and/or when to transmit the one or more response messages to the recipient vehicles and/or other devices. In some examples, the QoS is a level of service associated with a recipient vehicle that is related to a level of priority that the recipient vehicle has to receive messages. As such, for example, recipient vehicles that have a high QoS will have priority to receive response messages prior to recipient vehicles that have a low QoS. In some examples, the performance parameters may include an end-to-end latency threshold and/or an information age threshold. An end-to-end latency threshold specifies a predetermined threshold amount of time between when a response message is transmitted and when the response message is received. An information age threshold specifies a predetermined threshold amount of age (e.g., related to an amount of time or "freshness" or "staleness") of the vehicle information.

In some examples, the network device can determine (e.g., when it is not urgent, such as in a non-emergency situation) to wait to send at least some of the response messages to recipient vehicles and/or other devices to improve transmission efficiency. In such examples, the network device can bundle multiple response messages together and transmit them at the same time to the recipient vehicles and/or other devices. In some cases, the network device can use the information contained within the informational message from the vehicle, the other information (e.g., characteristics of other vehicles, location information associated with a location or scene of the other vehicles, weather conditions, traffic conditions, etc.), the QoS associated with each of the recipient vehicles, and the performance parameters associated with each of the recipient vehicles to determine whether to bundle at least some of the response messages for transmission.

In some cases, the network device may transmit the response messages to the recipient vehicles via a network entity, such as a base station or portion thereof. In some examples, a gNodeB (gNB) or an evolved NodeB (eNB) may be employed for the network entity. As noted above, the network device and the network entity may be co-located together (e.g., a MEC co-located with a gNB or eNB) or, alternatively, the network device and the network entity may be located remotely from one another (e.g., a MEC located remotely from a gNB or eNB). In some techniques, the network entity may be used to determine whether to bundle some of the response messages for transmission.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more frequencies (e.g., carriers or subcarriers). The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi or WLAN access point (AP) 150 in communication with Wi-Fi or WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as an RSU), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as RSU 107, etc. Aspects of the communication may be based on PC5 or sidelink communication e.g., as described in connection with the example in FIG. 2A. Although the following description may provide examples for V2X/D2D communication in connection with 5G NR, the concepts described herein may be applicable to other similar areas, such as LTE, LTE-A, CDMA, GSM, and other wireless technologies.

Figure 2A:
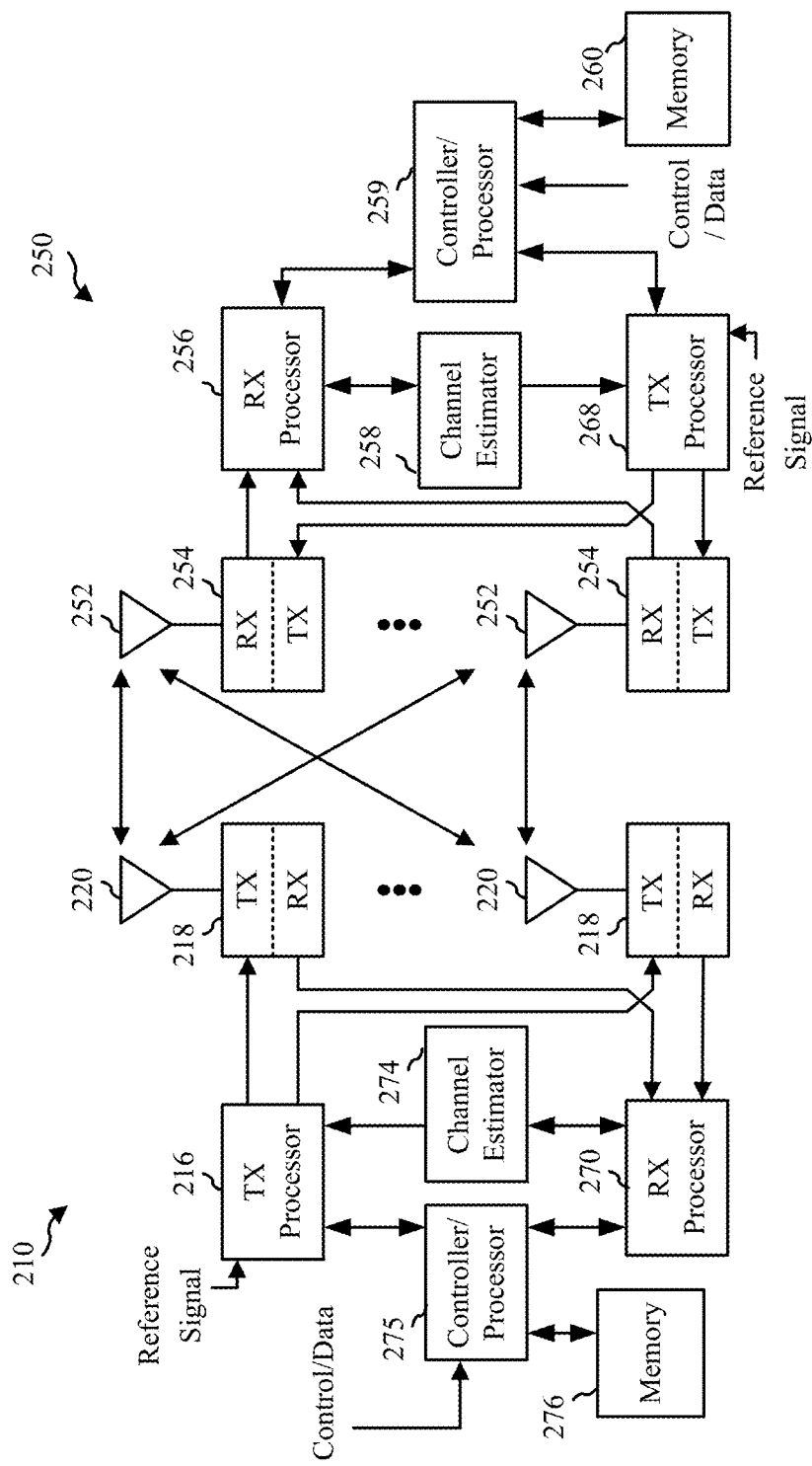
FIG. 2A is a diagram illustrating an example of a first device and a second device involved in wireless communications (e.g., V2V communications, V2X communications, and/or other device-to-device communication), in accordance with some aspects of the present disclosure.

FIG. 2A is a block diagram 200 of a first wireless communication device 210 in communication with a second wireless communication device 250, e.g., via V2V/V2X/other communication. The device 210 may comprise a transmitting device communicating with a receiving device, e.g., device 250. The communication may be based, e.g., on sidelink. The transmitting device 210 may comprise a UE, an RSU, etc. The receiving device may comprise a UE, an RSU, etc. Packets may be provided to a controller/processor 275 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the device 250. Each spatial stream may then be provided to a different antenna 220 via a separate transmitter 218TX. Each transmitter 218TX may modulate an RF carrier with a respective spatial stream for transmission.

At the device 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the device 250. If multiple spatial streams are destined for the device 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 210. These soft decisions may be based on channel estimates computed by the channel estimator 258. The soft decisions are then decoded and deinterleaved to recover the data and control signals that were originally transmitted by device 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. The controller/processor 259 may provide demultiplexing between transport and logical channels, packet reassembly, deciphering, header decompression, and control signal processing. The controller/processor 259 is also responsible for error detection using an ACK and/or NACK protocol to support HARQ operations.

Similar to the functionality described in connection with the transmission by device 210, the controller/processor 259 may provide RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by device 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The transmission is processed at the device 210 in a manner similar to that described in connection with the receiver function at the device 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. The controller/processor 275 provides demultiplexing between transport and logical channels, packet reassembly, deciphering, header decompression, control signal processing. The controller/processor 275 is also responsible for error detection using an ACK and/or NACK protocol to support HARQ operations.

At least one of the TX processor 268, the RX processor 256, or the controller/processor 259 of device 250 or the TX 216, the RX processor 270, or the controller/processor 275 may be configured to perform aspects described in connection with 298 or 299 of FIG. 1.

Figure 2B:
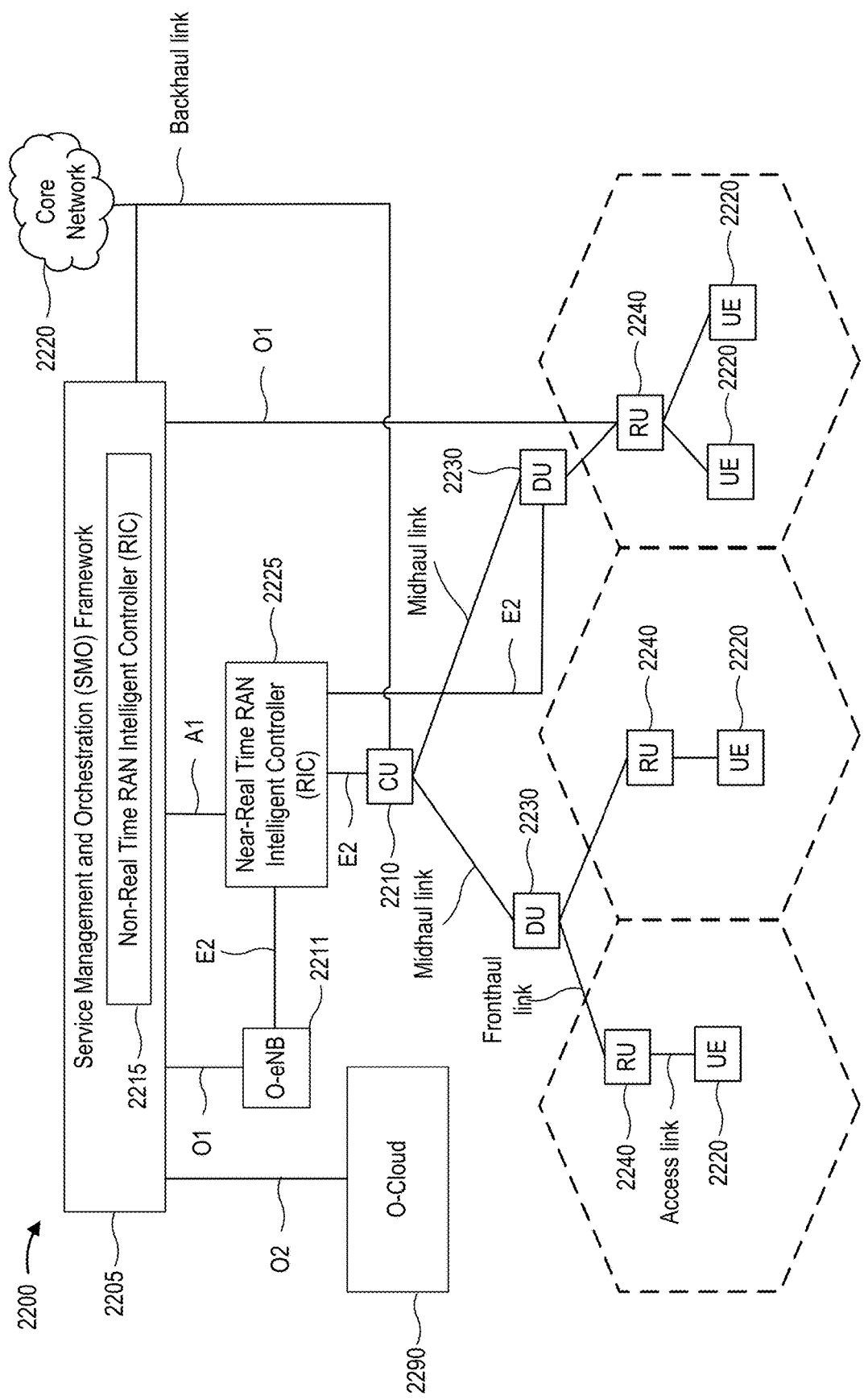
FIG. 2B is a diagram illustrating an example of a disaggregated base station architecture, which may be employed by the disclosed system for providing optimized vehicular-based messages (e.g., safety messages) to equipped vehicles (e.g., V2X enabled vehicles), in accordance with some examples.

FIG. 2B is a diagram illustrating an example of a disaggregated base station 2200 architecture, which may be employed by the disclosed system for providing optimized vehicular-based messages (e.g., safety messages) to equipped vehicles (e.g., V2X enabled vehicles), in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2B shows a diagram illustrating an example disaggregated base station 2200 architecture. The disaggregated base station 2200 architecture may include one or more central units (CUs) 2210 that can communicate directly with a core network 2220 via a backhaul link, or indirectly with the core network 2220 through one or more disaggregated base station units (such as a Near-Real Time (Near-RT) RAN Intelligent Controller (RIC) 2225 via an E2 link, or a Non-Real Time (Non-RT) RIC 2215 associated with a Service Management and Orchestration (SMO) Framework 2205, or both). A CU 2210 may communicate with one or more distributed units (DUs) 2230 via respective midhaul links, such as an F1 interface. The DUs 2230 may communicate with one or more radio units (RUS) 2240 via respective fronthaul links. The RUs 2240 may communicate with respective UEs 2220 via one or more RF access links. In some implementations, the UE 2220 may be simultaneously served by multiple RUs 2240.

Each of the units, i.e., the CUs 2210, the DUs 2230, the RUs 2240, as well as the Near-RT RICs 2225, the Non-RT RICs 2215 and the SMO Framework 2205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 2210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2210. The CU 2210 may be configured to handle user plane functionality (i.e., Central Unit-User Plane (CU-UP)), control plane functionality (i.e., Central Unit-Control Plane (CU-CP)), or a combination thereof. In some implementations, the CU 2210 can be logically split into one or more CU-UP units and one or more CU-CP units. The CU-UP unit can communicate bidirectionally with the CU-CP unit via an interface, such as the E1 interface when implemented in an O-RAN configuration. The CU 2210 can be implemented to communicate with the DU 2230, as necessary, for network control and signaling.

The DU 2230) may correspond to a logical unit that includes one or more base station functions to control the operation of one or more RUs 2240. In some aspects, the DU 2230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 2230 may further host one or more low PHY layers. Each layer (or module) can be implemented with an interface configured to communicate signals with other layers (and modules) hosted by the DU 2230, or with the control functions hosted by the CU 2210.

Lower-layer functionality can be implemented by one or more RUs 2240. In some deployments, an RU 2240, controlled by a DU 2230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2240) can be implemented to handle over the air (OTA) communication with one or more UEs 2220. In some implementations, real-time and non-real-time aspects of control and user plane communication with the RU(s) 2240) can be controlled by the corresponding DU 2230. In some scenarios, this configuration can enable the DU(s) 2230 and the CU 2210 to be implemented in a cloud-based RAN architecture, such as a vRAN architecture.

The SMO Framework 2205 may be configured to support RAN deployment and provisioning of non-virtualized and virtualized network elements. For non-virtualized network elements, the SMO Framework 2205 may be configured to support the deployment of dedicated physical resources for RAN coverage requirements which may be managed via an operations and maintenance interface (such as an O1 interface). For virtualized network elements, the SMO Framework 2205 may be configured to interact with a cloud computing platform (such as an open cloud (O-Cloud) 2290) to perform network element life cycle management (such as to instantiate virtualized network elements) via a cloud computing platform interface (such as an O2 interface). Such virtualized network elements can include, but are not limited to, CUs 2210, DUs 2230, RUs 2240 and Near-RT RICs 2225. In some implementations, the SMO Framework 2205 can communicate with a hardware aspect of a 4G RAN, such as an open eNB (O-eNB) 2211, via an O1 interface. Additionally, in some implementations, the SMO Framework 2205 can communicate directly with one or more RUs 2240 via an O1 interface. The SMO Framework 2205 also may include a Non-RT RIC 2215 configured to support functionality of the SMO Framework 2205.

The Non-RT RIC 2215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2225. The Non-RT RIC 2215 may be coupled to or communicate with (such as via an A1 interface) the Near-RT RIC 2225. The Near-RT RIC 2225 may be configured to include a logical function that enables near-real-time control and optimization of RAN elements and resources via data collection and actions over an interface (such as via an E2 interface) connecting one or more CUs 2210, one or more DUs 2230, or both, as well as an O-eNB, with the Near-RT RIC 2225.

In some implementations, to generate AI/ML models to be deployed in the Near-RT RIC 2225, the Non-RT RIC 2215 may receive parameters or external enrichment information from external servers. Such information may be utilized by the Near-RT RIC 2225 and may be received at the SMO Framework 2205 or the Non-RT RIC 2215 from non-network data sources or from network functions. In some examples, the Non-RT RIC 2215 or the Near-RT RIC 2225 may be configured to tune RAN behavior or performance. For example, the Non-RT RIC 2215 may monitor long-term trends and patterns for performance and employ AI/ML models to perform corrective actions through the SMO Framework 2205 (such as reconfiguration via O1) or via creation of RAN management policies (such as A1 policies).

Figure 3:
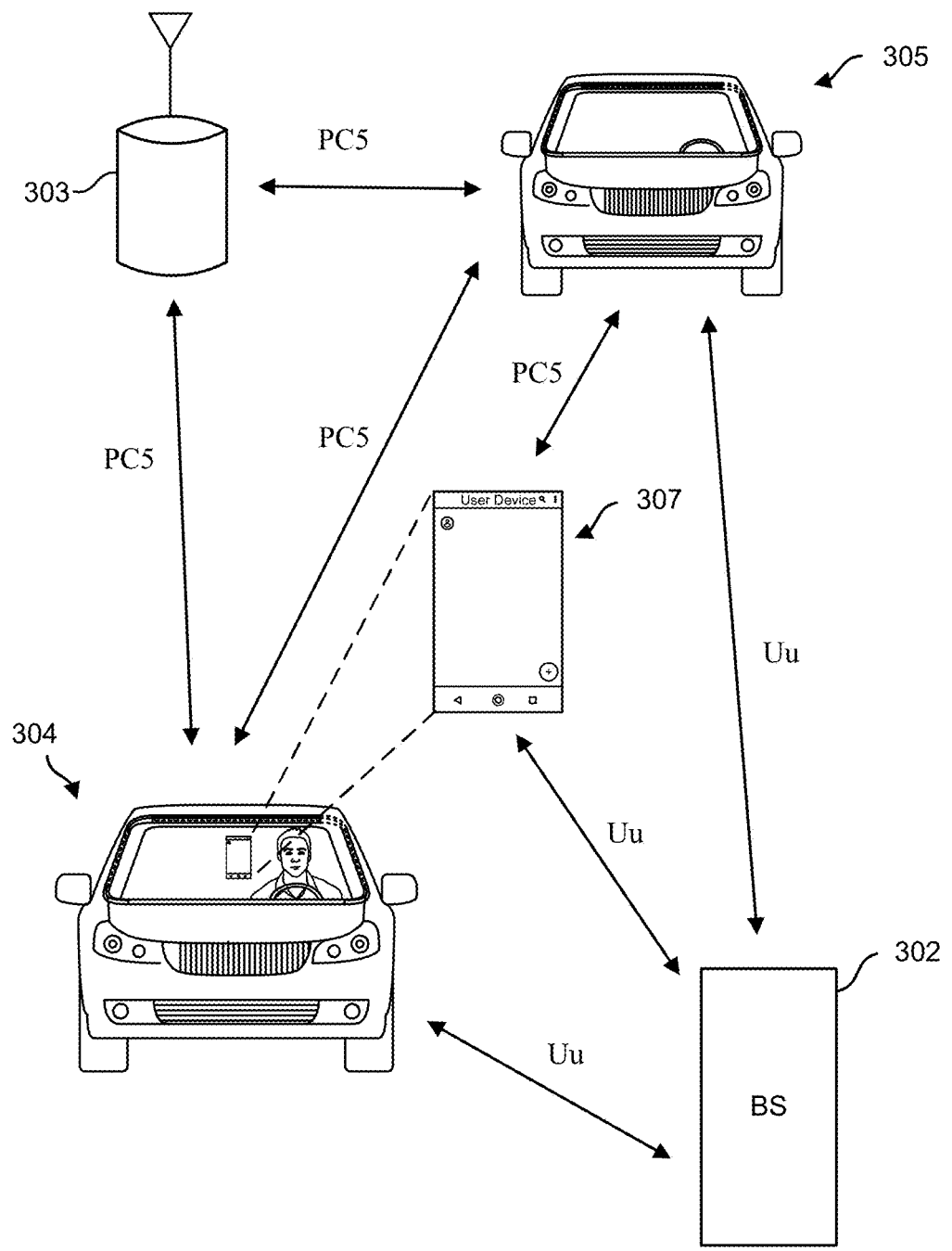
FIG. 3 is a diagram illustrating an example of various user equipment (UEs) communicating over direct communication interfaces (e.g., a cellular based PC5 sidelink interface, 802.11p defined Dedicated Short Range Communication (DSRC) interface, or other direct interface) and wide area network (Uu) interfaces, in accordance with some aspects of the present disclosure.

FIG. 3 illustrates examples of different communication mechanisms used by various UEs. In one example of sidelink communications, FIG. 3 illustrates a vehicle 304, a vehicle 305, and an RSU 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface (or other device to device direct interface, such as a DSRC interface), as shown in FIG. 3.

While FIG. 3 illustrates a particular number of vehicles (e.g., two vehicles 304 and 305) communicating with each other and/or with RSU 303, BS 302, and/or user device 307, the present disclosure is not limited thereto. For instance, tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
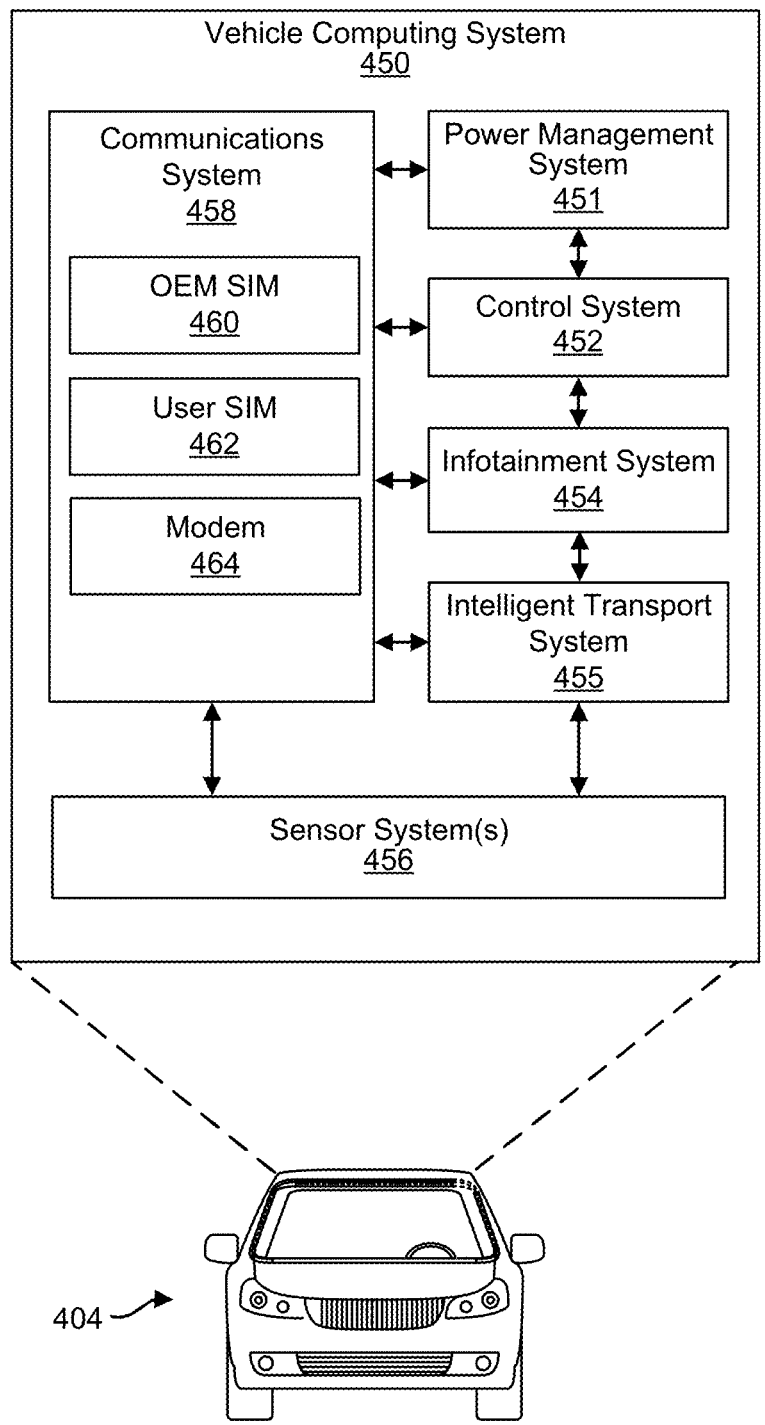
FIG. 4 is a block diagram illustrating an example of a computing system of a vehicle, in accordance with some aspects of the present disclosure.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., "9-1-1"

in the United States, "1-1-2" in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 can include the intelligent transport system (ITS) 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. One or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. A thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than ( ). When including multiple sensor systems, the sensor system(s) 456 can include different types of sensor systems that can be arranged on or in different parts the vehicle 404. The sensor system(s) 456 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450) can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
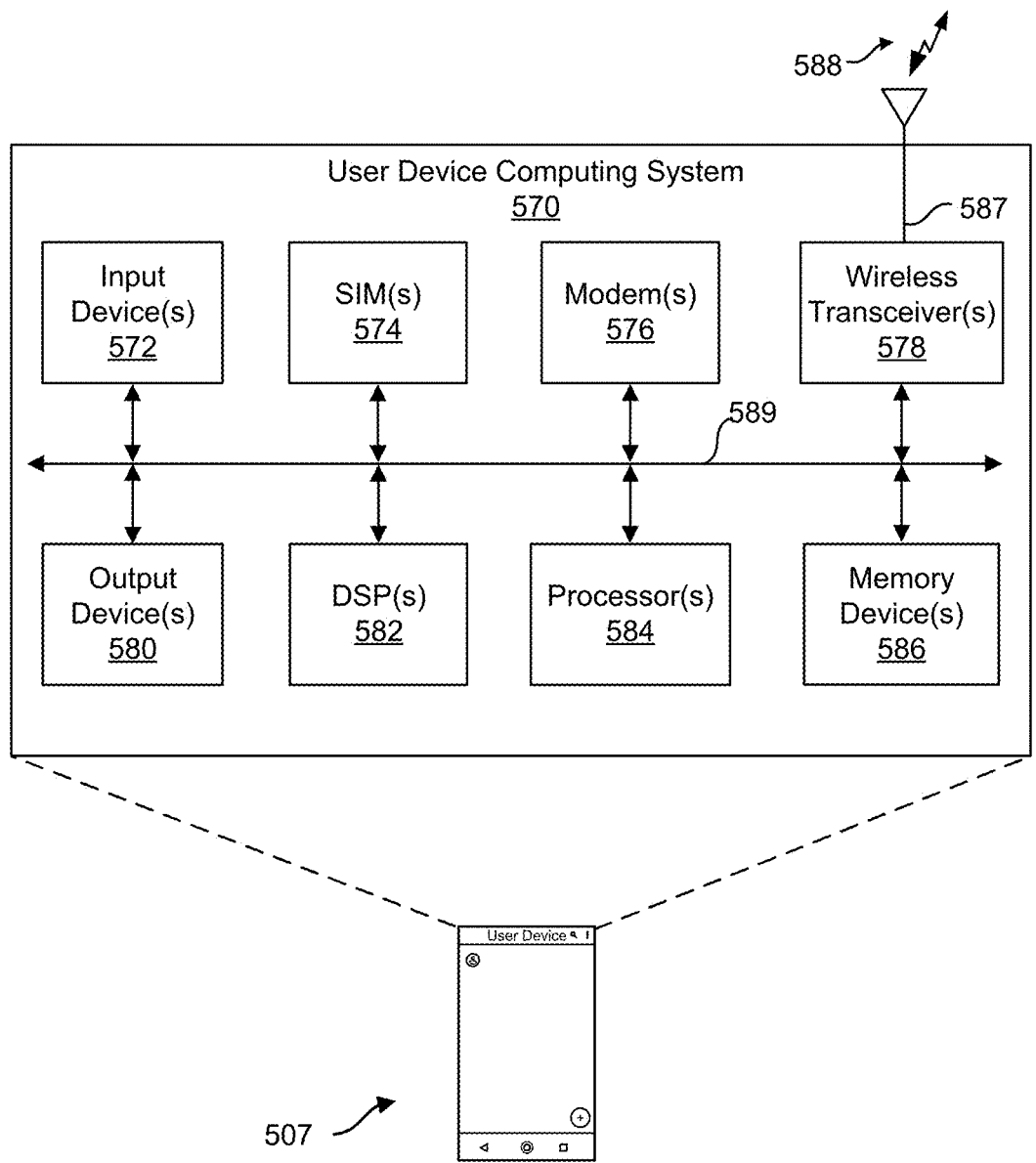
FIG. 5 is a block diagram illustrating an example of a computing system of a user device, in accordance with some aspects of the present disclosure.

FIG. 5 illustrates an example of a computing system 570 of a user device 507. The user device 507 is an example of a UE that can be used by an end-user. For example, the user device 507 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICS, FPGAS, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFI routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 6:
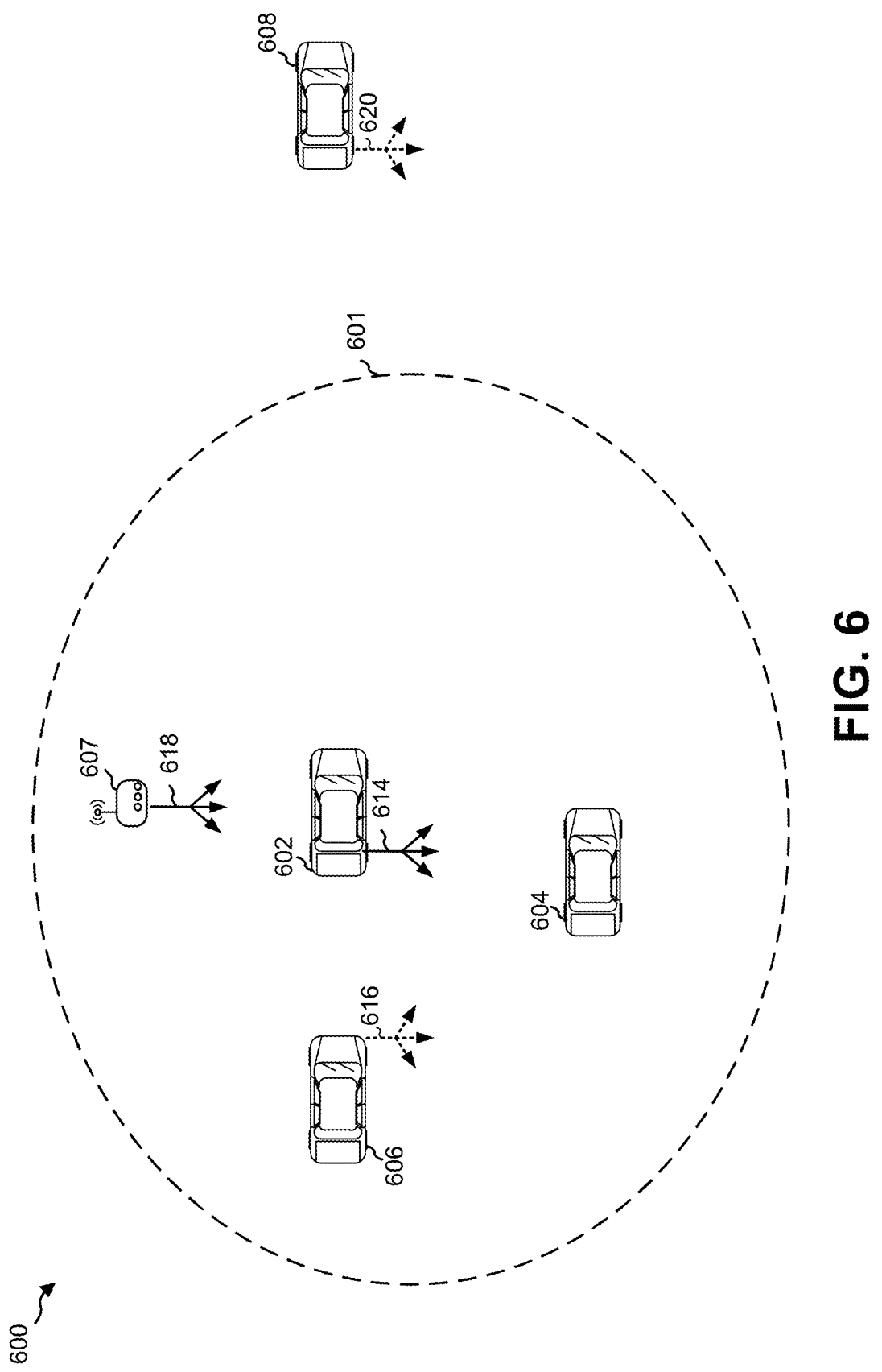
FIG. 6 is a diagram illustrating an example of devices involved in wireless communications (e.g., sidelink communications), in accordance with some aspects of the present disclosure.

FIG. 6 illustrates an example 600 of wireless communication between devices based on sidelink communication, such as V2X or other D2D communication. The communication may be, for example, based on a slot structure. For example, transmitting UE 602 may transmit a transmission 614, e.g., comprising a control channel and/or a corresponding data channel, that may be received by receiving UEs 604, 606, 608. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 602, 604, 606, 608 may each be capable of operating as a transmitting device in addition to operating as a receiving device. Thus, UEs 606, 608 are illustrated as transmitting transmissions 616, 620, respectively. The transmissions 614, 616, 620 (and 618 by RSU 607) may be broadcast or multicast to nearby devices. For example, UE 614 may transmit communication intended for receipt by other UEs within a range 601 of UE 614. Additionally/alternatively, RSU 607 may receive communication from and/or transmit communication 618 to UEs 602, 604, 606, 608.

Figure 7A:
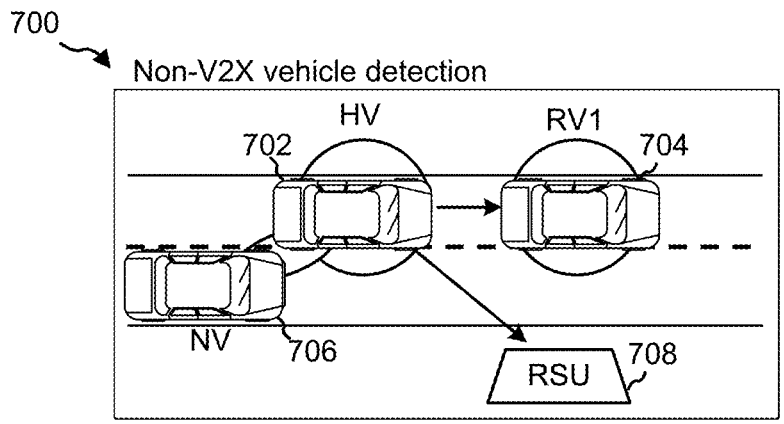
FIGS. 7A-7D are diagrams illustrating examples of sensor-sharing for cooperative and automated driving systems, in accordance with some aspects of the present disclosure.
Figure 7B:
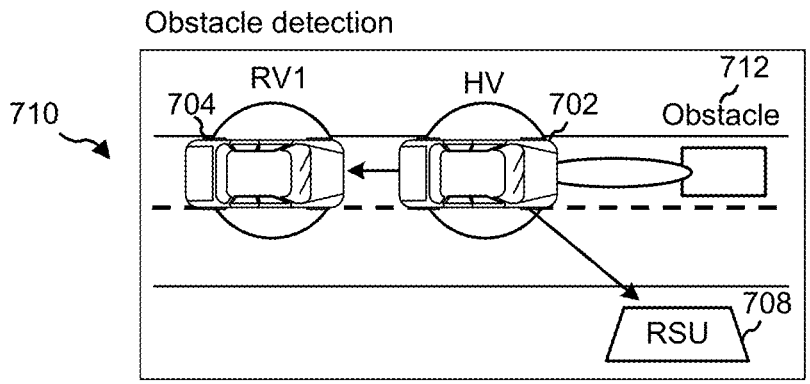
Figure 7C:
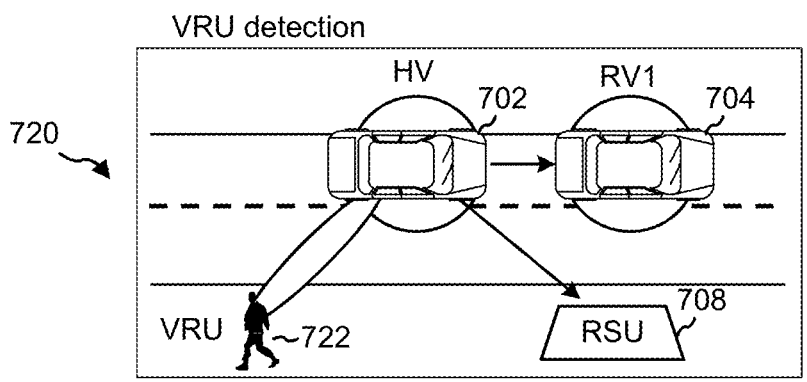
Figure 7D:
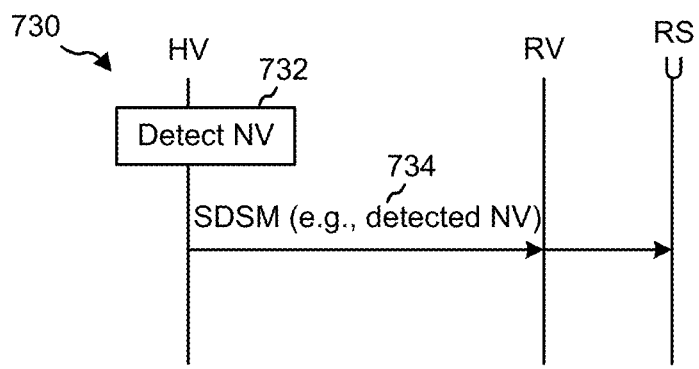
Figure 8:
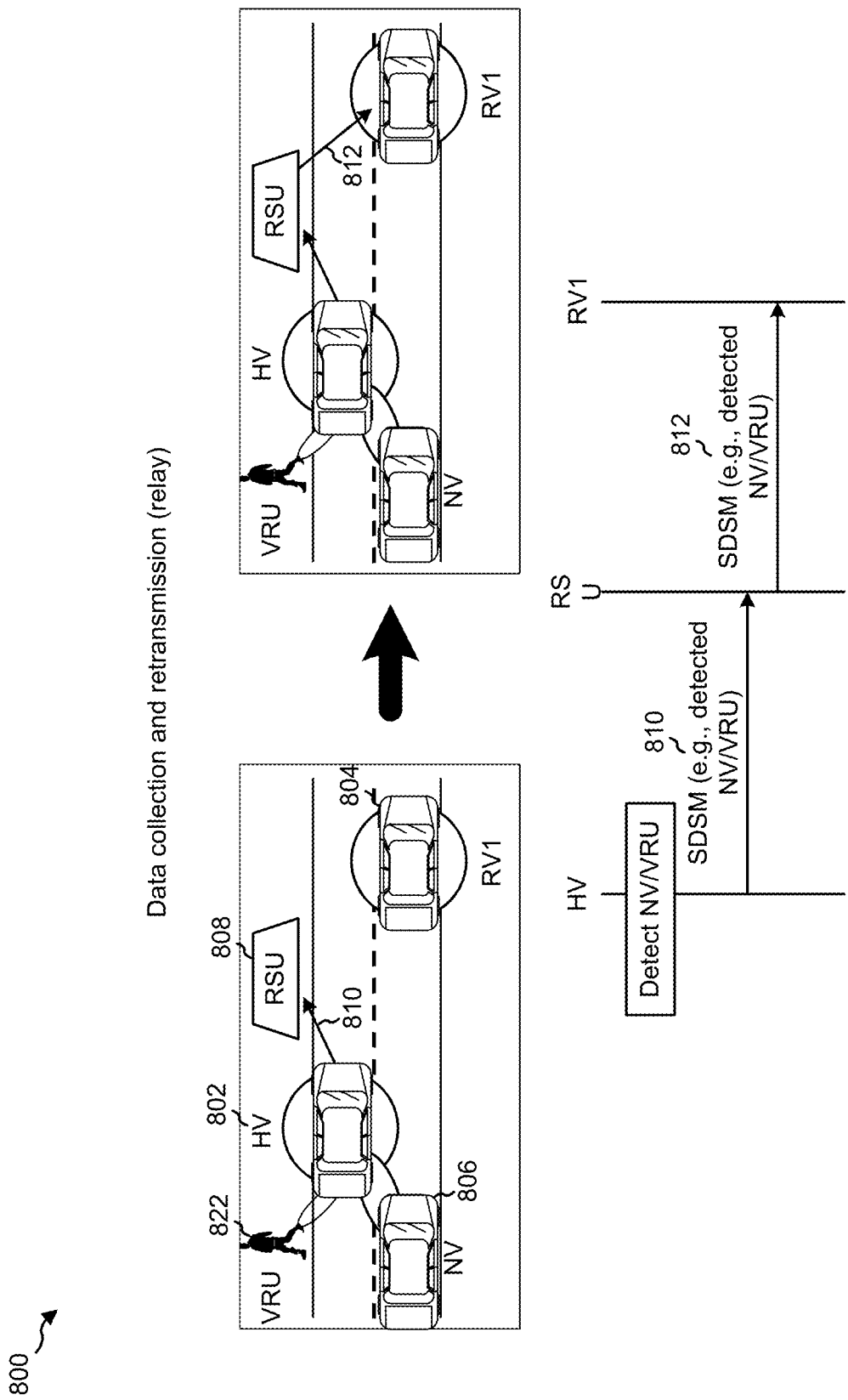
FIG. 8 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 700 of FIG. 7A, the host vehicle (HV) 702 may detect a number of items within its environment. For example, the HV 702 may detect the presence of the non-V2X entity (NV) 706 at block 732. The HV 702 may inform other entities, such as a first remote vehicle (RV1) 704 or a RSU 708, about the presence of the NV 706, if the RV1 704 and/or the RSU 708, by themselves, are unable to detect the NV 706. The HV 702 informing the RV1 704 and/or the RSU 708 about the NV 706 is a sharing of sensor information. With reference to diagram 710 of FIG. 7B, the HV 702 may detect a physical obstacle 712, such as a pothole, debris, or an object that may be an obstruction in the path of the HV 702 and/or RV1 704 that has not yet been detected by RV1 704 and/or RSU 708. The HV 702 may inform the RV1 and/or the RSU 708 of the obstacle 712, such that the obstacle 712 may be avoided. With reference to diagram 720 of FIG. 7C, the HV 702 may detect the presence of a vulnerable road user (VRU) 722 and may share the detection of the VRU 722 with the RV1 704 and the RSU 708, in instances where the RSU 708 and/or RV1 704 may not be able to detect the VRU 722. With reference to diagram 730 of FIG. 7D, the HV, upon detection of a nearby entity (e.g., NV, VRU, obstacle) may transmit a sensor data sharing message (SDSM) 734 to the RV and/or the RSU to share the detection of the entity. The SDSM 734 may be a broadcast message such that any receiving device (e.g., vehicle, pedestrian device, RSU, etc.) within the vicinity of the HV may receive the message. In some instances, the shared information may be relayed to other entities, such as RVs. For example, with reference to diagram 800 of FIG. 8, the HV 802 may detect the presence of the NV 806 and/or the VRU 822. The HV 802 may broadcast the SDSM 810 to the RSU 808 to report the detection of NV 806 and/or VRU 822. The RSU 808 may relay the SDSM 810 received from the HV 802 to remote vehicles such that the remote vehicles are aware of the presence of the NV 806 and/or VRU 822. For example, the RSU 808 may transmit an SDSM 812 to the RV1 804, where the SDSM 812 includes information related to the detection of NV 806 and/or VRU 822.

Figure 9A:
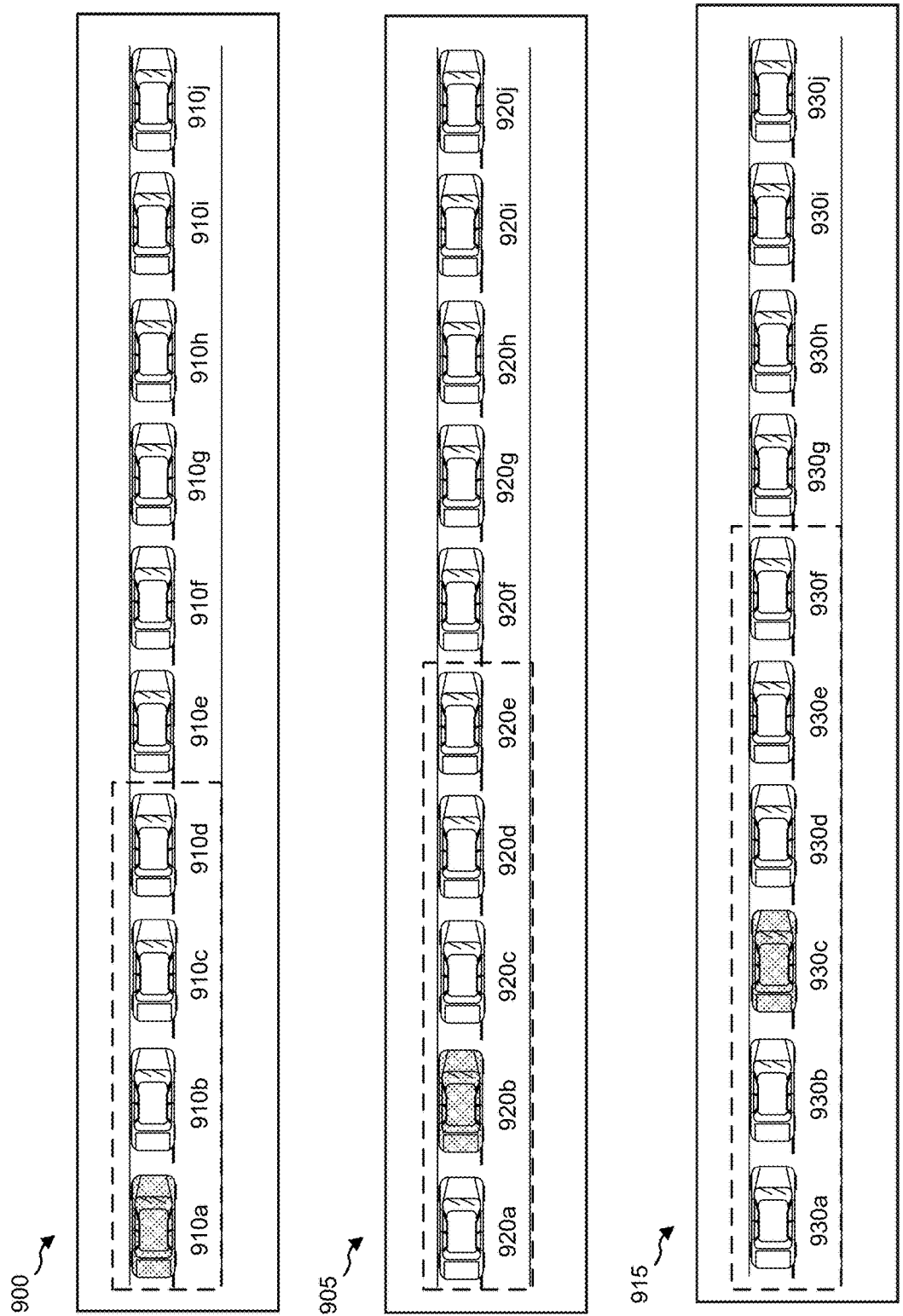

FIGS. 9A and 9B are diagrams that illustrate example ranges for V2X enabled vehicles (e.g., which may be C-V2X enabled vehicles), in accordance with some aspects of the present disclosure. As previously mentioned, V2X communications may employ an IEEE 802.11p based DSRC interface, an LTE C-V2X sidelink PC5 interface, or other device-to-device communications interface. In V2X communications, these interfaces may be used for the communication of safety messages, such as basic safety messages (BSMs) and/or cooperative awareness messages (CAMs), among V2X enabled vehicles in an intelligent transportation system (ITS). Examples of key performance parameters (KPIs) for these safety messages may include end to end latency and information age (e.g., an amount of time since the obtaining or determining of the information).

The safety messages (e.g., BSMs and CAMs) may be broadcasted over these interfaces to all V2X enabled vehicles located within range. Communications over these interfaces is on the physical layer, where the broadcast is essentially a sidelink between V2X enabled vehicles. The communications of messages is range limited, as UEs (e.g., V2X enabled vehicles) have a range that is bound by certain device characteristics, such as a maximum transmission power. Range may be defined as the distance where a message is received with at least ninety (90) percent (%) accuracy.

Since both the IEEE 802.11p based DSRC interface and the LTE C-V2X sidelink PC5 interface are range limited (e.g., by approximately 1 km), these wireless technologies have the disadvantage of not allowing the wireless exchange of information between vehicles that are located apart by more than the limited range (e.g., separated by 1 km or more in distance). This limitation of range implicitly controls the effective "neighbor list" for each of the V2X enabled vehicles.

For the examples of FIGS. 9A and 9B, each V2X enabled vehicle (e.g., a transmitter/receiver vehicle) may have a communication range such that a V2X enabled vehicle (e.g., a transmitter/receiver vehicle) is only able to transmit and/or receive messages from V2X enabled vehicles that are located within a distance of three V2X enabled vehicles away (in either direction) from the V2X enabled vehicle (e.g., a transmitter/receiver vehicle). For example, based on a position of a particular V2X enabled vehicle (e.g., a transmitter/receiver vehicle) in FIG. 9A or FIG. 9B, the V2X enabled vehicle (e.g., a transmitter/receiver vehicle) may only receive messages from a maximum number of six V2X enabled vehicles (e.g., the "neighbor list" for the V2X enabled vehicle may contain a maximum of six V2X enabled vehicles). The number of V2X enabled vehicles within communication range will vary based on the range and traffic density.

For example, in the example road configuration 900 in FIG. 9A including V2X vehicles 910a, 910b, 910c, 910d, 910e, 910f, 910g, 910h, 910i, and 910j (collectively referred to as V2X vehicles 910a-910j), V2X enabled vehicle 910a can only transmit and/or receive messages from V2X enabled vehicles 910b, 910c, and 910d. In the example road configuration 905 in FIG. 9A including V2X vehicles 920a, 920b, 920c, 920d, 920e, 920f, 920g, 920h, 920i, and 920j (collectively referred to as V2X vehicles 920a-920j), V2X enabled vehicle 920b can only transmit and/or receive messages from V2X enabled vehicles 920a, 920c, 920d, and 920d. In the example road configuration 915 in FIG. 9A, which contains V2X vehicles 930a, 930b, 930c, 930d, 930e, 930f, 930g, 930h, 930i, and 930j (collectively referred to as V2X vehicles 930a-930j), V2X enabled vehicle 930c can only transmit and/or receive messages from V2X enabled vehicles 930a, 930b, 930d, 930e, and 930f.

Also, in the example road configuration 925 in FIG. 9B, which contains V2X vehicles 940a, 940b, 940c, 940d, 940e, 940f, 940g, 940h, 940i, and 940j (collectively referred to as V2X vehicles 940a-940j), V2X enabled vehicle 940d can only transmit and/or receive messages from V2X enabled vehicles 940a, 940b, 940c, 940e, 940f, and 940g. In the example road configuration 935 in FIG. 9B, which contains V2X vehicles 950a, 950b, 950c, 950d, 950e, 950f, 950g, 950h, 950i, and 950j (collectively referred to as V2X vehicles 950a-950j), V2X enabled vehicle 950e can only transmit and/or receive messages from V2X enabled vehicles 950b, 950c, 950d, 950f, 950g, and 950h. In the example road configuration 945 in FIG. 9B, which contains V2X vehicles 960a, 960b, 960c, 960d, 960e, 960f, 960g, 960h, 960i, and 960j (collectively referred to as V2X vehicles 960a-960j), V2X enabled vehicle 960f can only transmit and/or receive messages from V2X enabled vehicles 960c, 960d, 960e, 960g, 960h, and 960i.

As previously mentioned, both the IEEE 802.11p based DSRC interface and the LTE C-V2X sidelink PC5 interface are range limited (e.g., by approximately 1 km) and, as such, these wireless technologies do not allow for the wireless exchange of information between vehicles that are located apart by more than the limited range (e.g., separated by 1 km or more in distance). In some wireless systems, such as LTE, 5G, etc., messages can be communicated with a network entity (e.g., base station, multi-access edge computing (MEC), or portion thereof, etc.) to increase the communications range among the V2X enabled vehicles.

Figure 10:
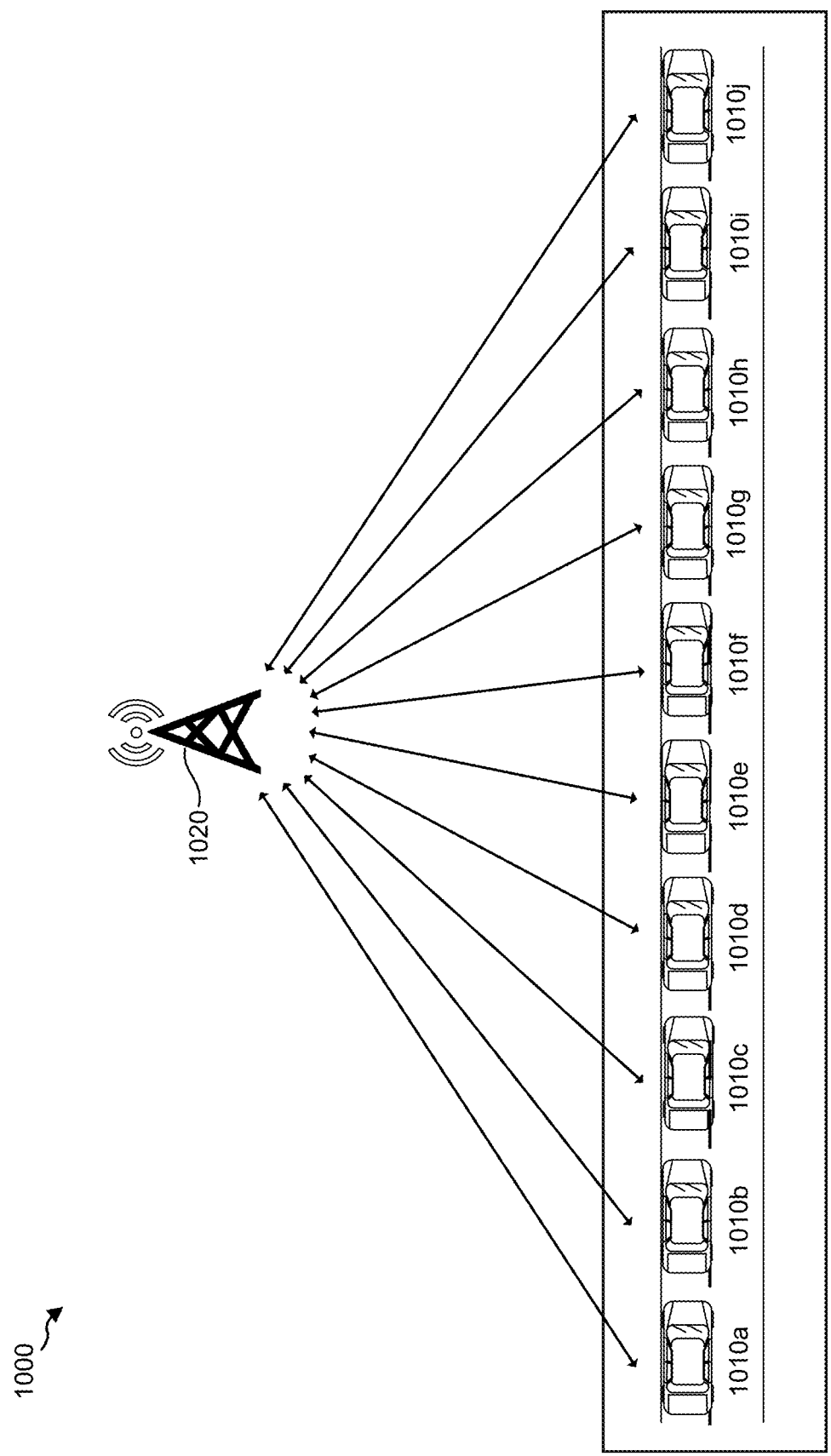
FIG. 10 is a diagram illustrating an example system including a network entity broadcasting messages to V2X enabled vehicles, in accordance with some aspects of the present disclosure.

FIG. 10 is a diagram illustrating an example system 1000 including a network entity 1020 broadcasting messages to V2X enabled vehicles 1010a, 1010b, 1010c, 1010d, 1010e, 1010f, 1010g, 1010h, 1010i, and 1010j (collectively referred to as V2X enabled vehicles 1010a-1010j). The network entity 1020 can include a MEC, a base station, or a portion thereof (e.g., one or more of a central unit (CU), a distributed unit (DU), a radio unit (RU), a Near-Real Time (Near-RT) RAN Intelligent Controller (RIC), or a Non-Real Time (Non-RT) RIC of the base station). In FIG. 10, the V2X enabled vehicles 1010a-1010j may communicate vehicle information (e.g., safety messages, such as BSMs and/or CAMs) to the network entity 1020, which is located within range of each of the V2X enabled vehicles 1010a-1010j. The network entity 1020 may then broadcast all of received vehicle information to each of the V2X enabled vehicles 1010a-1010j located within its range. It should be noted that the network entity 1020 does not have any intelligence or inherent control regarding the transmission of specific vehicle information to specific V2X enabled vehicles 1010a-1010j. As such, the network entity 1020 may only transmit a group broadcast containing all of the received vehicle information to all of the V2X enabled vehicles 1010a-1010j within range. In flooding the air interface with a group broadcast, the network entity 1020 is not efficiently using transmission power and/or frequency bandwidth.

It should be noted that the range limitation of the IEEE 802.11p based DSRC interface and the LTE C-V2X sidelink PC5 interface can lead to problems with overtaking situations where, for example, a vehicle is attempting to overtake (pass) an obstructing vehicle (e.g., a truck) that is located in front of the vehicle and is blocking the vehicle's view of an oncoming vehicle. For these cases, when the vehicles are driving at high speeds, a much larger range is needed to receive the safety message, such as a do not pass warning (DNPW), sufficiently in time to prevent a collision.

Figure 11:
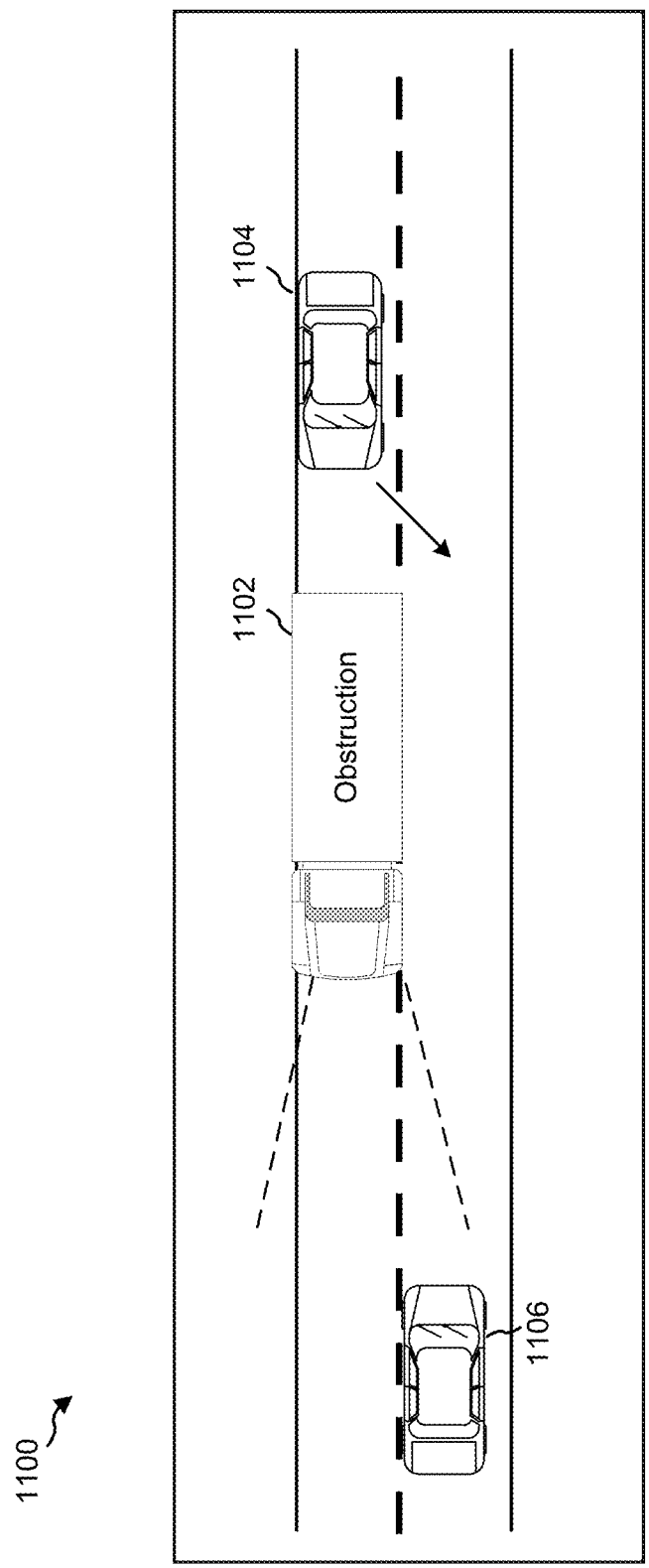
FIG. 11 is a diagram illustrating an example of a scene including an obstructing vehicle, in accordance with some aspects of the present disclosure.

FIG. 11 is a diagram illustrating an example of a vehicle configuration 1100 (e.g., an overtaking situation), which has an obstructing vehicle 1102, in accordance with some aspects of the present disclosure. The vehicle configuration 1100 in FIG. 11 depicts an example of a "see through use case." In particular, in FIG. 11, a vehicle 1104 is shown to be driving behind the obstructing vehicle (e.g., a truck) 1102. The vehicle 1104 (or driver of the vehicle) desires to pass (overtake) the obstructing vehicle 1102. However, the obstructing vehicle 902 is obstructing a field of view (FOV) of the vehicle 1104 and, as such, vehicle 1104 is not aware of oncoming vehicle 1106 located in the opposite lane and driving in the opposite direction of vehicle 1104, because vehicle 1104 is not able to see (or sense) the oncoming vehicle 1106 through the obstructing vehicle 1102. It should be noted that, in general, a "see through use case" is directed to vehicle configurations where at least one obstruction (e.g., an obstructing vehicle, such as obstructing vehicle 1102, or other obstructing structure or object) is blocking a vehicle's FOV regarding at least one upcoming road danger. As used herein, a FOV of a vehicle refers to a respective FOV of one or more sensors (e.g., cameras, radar, LIDAR, any combination thereof, and/or other sensors) of the vehicle. Further, reference herein to a vehicle "seeing" or not "seeing" another object, such as another vehicle, pedestrian, etc., refers to whether the other object is within a FOV of a sensor or multiple sensors of the vehicle.

In order to effectively increase the range of information exchange among equipped vehicles (e.g., V2X enabled vehicles), the system of the present disclosure employs a central network device to orchestrate and manage the sharing of vehicle information (e.g., vehicular-based messages, such as safety messages including BSMs and CAMs) amongst the equipped vehicles. The communications and computation are centralized at a single network device, thereby providing for efficient use of bandwidth and power as well as supporting ultra-low latency. The network device has the advantage of providing low latency along with a high range of transmission (e.g., a transmission range greater than 1 km). In one or more examples, a 5G multi-access edge computing (MEC) device, which can have a transmission range of at least several kilometers (kms), may be employed as the network device. In some examples, a wide area network (Uu) interface may be utilized as the air interface for transmission between the equipped vehicles and the network device.

Figure 12:
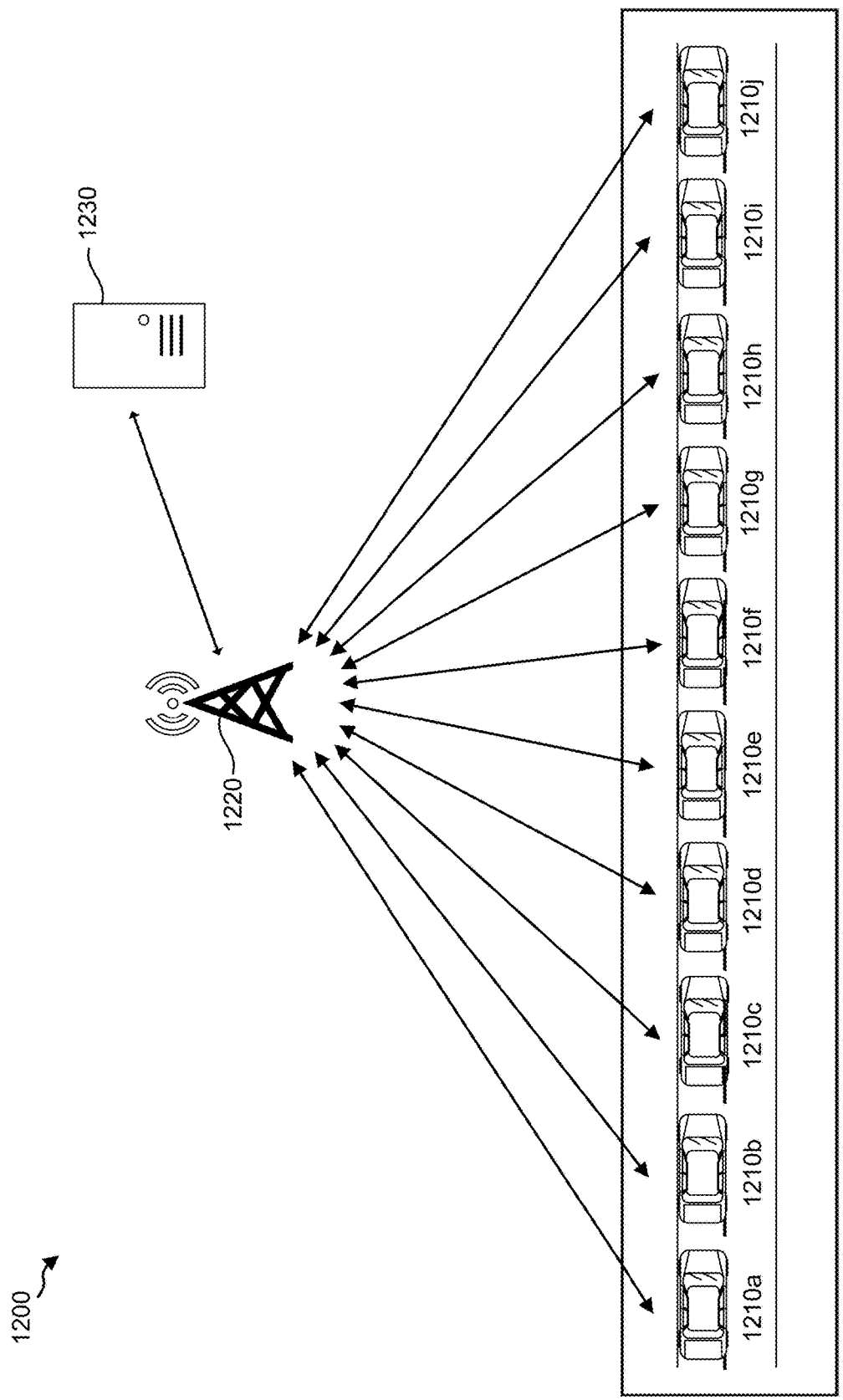
FIG. 12 is a diagram illustrating an example of a system for providing optimized vehicular-based messages (e.g., safety messages) to equipped vehicles (e.g., V2X enabled vehicles), in accordance with some aspects of the present disclosure.

FIG. 12 is a diagram illustrating the disclosed system 1200 for providing optimized vehicular-based messages (e.g., safety messages, such as BSMs and CAMs) to equipped vehicles 1210a, 1210b, 1210c, 1210d, 1210e, 1210f, 1210g, 1210h, 1210i, and 1210j (collectively referred to as equipped vehicles 1210a-1210j), in accordance with some aspects of the present disclosure. The equipped vehicles 1210a, 1210b, 1210c, 1210d, 1210e, 1210f, 1210g, 1210h, 1210i, and 1210j may be V2X-equipped or enabled vehicles configured to communicate using any type of sidelink communication mechanism (e.g., C-V2X, DSRC, etc.). In FIG. 12, the system 1200 may include the equipped vehicles 1210a-1210j, a base station 1220 (e.g., an eNB or gNB), and a network device 1230 (e.g., a MEC device). It should be noted that the disclosed system 1200 may have more or less equipped vehicles, base stations, and/or network devices than as is shown in FIG. 12. In some implementations, the vehicles 1210a-1210j can communicate directly with the network device 1230, in which case the base station 1220 may not be involved in the exchange of messages between the equipped vehicles 1210a-1210j and the network device 1230.

During operation of the disclosed system 1200 of FIG. 12, one or more of the equipped vehicles 1210a-1210j may transmit (e.g., over Uu interface or other information) one or more informational messages to the base station 1220 (or portion thereof, such as one or more of a CU, a DU, a RU, a Near-RT RIC, or a Non-RT RIC of the base station 1220), which is located within range of each of the equipped vehicles 1210a-1210j. For instance, each equipped vehicle from the equipped vehicles 1210a-1210j may transmit a respective informational message with information associated with each respective equipped vehicle 1210a-1210j to the base station 1220 (or portion thereof). The one or more informational messages may include information or characteristics (e.g., vehicle information) related to the equipped vehicle 1210a-1210j (e.g., a respective position of each vehicle, an accuracy of each respective position, a speed of each respective vehicle, a direction in which each respective vehicle is traveling, an event of each respective vehicle such as breaking or lane change, and/or other information related to each respective vehicle), traffic conditions (e.g., low speed and/or dense traffic, high speed traffic, information related to an accident, etc.), weather conditions (e.g., rain, snow, etc.), message type (e.g., an emergency message, a non-emergency or "regular" message), etc.), road topology (line-of-sight (LOS) or non-LOS (NLOS), etc.), any combination, thereof, and/or other information or characteristics.

The one or more informational messages may also include information regarding a preference or parameter of each vehicle from the equipped vehicle 1210a-1210j indicating whether to receive informational messages from other certain specific equipped vehicles 1210a-1210j. In some cases, the one or more informational messages may include the current capabilities of each vehicle from the equipped vehicle 1210a-1210j, such as each vehicle's processing capabilities, each vehicle's thermal requirement, capability, or status (which can affect the vehicle's ability to process data), each vehicle's state of health, etc. In some implementations, the one or more informational messages may include information indicating a specific use case or safety warning, such as a do-not-pass warning (DNPW) or a forward collision warning (FCW), related to the current conditions of each vehicle from the equipped vehicles 1210a-1210j. In some examples, the one or more informational messages may be in the form of a standard basic safety message (BSM), a cooperative awareness message (CAM), a sensor data sharing message (SDSM), and/or other format. It should be noted that, in one or more examples, at least some of this information may be provided (e.g., to the network device 1230) by a traffic message channel (TMC) and/or RSU, instead of from the one or more informational messages.

In some aspects, some or all of the equipped vehicles 1210a-1210j may transmit one or more values or scores associated with the example information or characteristics described above, for instance instead of sending the actual information or characteristics. In one illustrative example, instead of transmitting a thermal capability or requirement of a vehicle 1210a, the vehicle 1210a may transmit a value between 0 and 10 that indicates a relative level of thermal capability or requirement of the vehicle 1210a. For instance, a value of ( ) can indicate that the vehicle 1210a has very low thermal capabilities (e.g., cannot operate at high temperatures), whereas a value of 10 can indicate that the vehicle 1210a has high thermal capabilities (e.g., is able to operate at high temperatures). In some cases, each vehicle can transmit a value or score for each item of information or characteristic associated with the vehicle (e.g., processing capabilities of the vehicle, thermal requirement or capability of the vehicle, state of health of the vehicle, etc.).

The base station 1220 may transmit the one or more informational messages to the network device 1230. After the network device 1230 receives the one or more informational messages from the base station 1220, the network device 1230 can use the information contained within the one or more informational messages along with other information (e.g., characteristics of other vehicles, location information associated with a location or scene of the other vehicles, weather conditions, traffic conditions, etc.) to generate one or more response messages and to determine which equipped devices (e.g., equipped vehicles 1210a-1210j and/or other equipped devices, such as V2X enabled devices including RSUs, pedestrian devices/UEs, network-equipped infrastructure such as a network-equipped traffic light, etc.) currently located within a communication range of the network device 1230 (and/or base station 1220) to transmit the one or more response messages. As noted herein, each response message may include information associated with one or more of the equipped vehicles 1210a-1210j. As used here, the equipped vehicles 1210a-1210j determined to receive the one or more response messages are referred to as recipient vehicles and other devices determined to receive one or more response messages are referred to as recipient devices.

In some aspects, a response message sent (e.g., over a Uu interface) to a recipient vehicle (e.g., any one of equipped vehicles 1210a-1210j) or other equipped device (e.g., RSU, pedestrian UE, network-equipped infrastructure, etc.) can include an informational message that the network device 1230 received from a particular vehicle from the equipped vehicles 1210a-1210j (or multiple information messages received from multiple vehicles, in some cases). For example, in such aspects, the network device 1230 can forward an informational message received from an equipped vehicle from the equipped vehicles 1210a-1210j to a recipient vehicle from the equipped vehicles 1210a-1210j or another network-equipped device (e.g., an RSU, a pedestrian device/UE, network-equipped infrastructure such as a network-equipped traffic light, etc.).

In some examples, the other information used by the network device 1230 to generate the one or more response messages and/or to determine which equipped devices to which to transmit the one or more response messages may include current weather conditions, traffic conditions, lighting conditions (e.g., time of day lighting conditions), road topology conditions, obstruction conditions, any combination thereof, and/or other information related to some or all of the equipped vehicles 1210a-1210j located within the traffic system. Once the network device 1230 generates the one or more response messages and determines the recipient vehicles and/or other devices, the network device 1230 may transmit the one or more response messages to the determined recipient vehicles and/or other devices via the base station 1220.

In some aspects, the network device 1230 can use the information contained within the one or more informational messages from the one or more equipped vehicles 1210a-1210j along with the other information (e.g., characteristics of other vehicles, location information associated with a location or scene of the other vehicles, weather conditions, traffic conditions, etc.) to generate a dynamic neighbor list (also referred to as a local dynamic map (LDM) or a dynamic surrounding map) for each of the vehicles 1210a-1210j (e.g., each of the recipient vehicles or transmitting vehicles). For example, each dynamic neighbor list can include a listing of all of the vehicles that are located within a specific predetermined distance (or radius of distance) away from a corresponding vehicle 1210a-1210j. In some cases, each dynamic neighbor list includes a mapping, which may include roads and terrain topology, of all of the vehicles that are located within a specific predetermined distance (or radius of distance) away from a corresponding vehicle 1210a-1210j. In some aspects, the network device 1230 can use the dynamic neighbor list to determine which devices (e.g., recipient vehicles 1210a-1210j or other vehicles or devices) can be recipient devices to which to send messages. In some cases, the network device 1230 may transmit a message with the dynamic neighbor list to devices that are not equipped to communicate V2X messages or that are not currently communicating V2X messages (e.g., to vehicles that are not communicating using PC5 or not capable of communicating using PC5). In some examples, each recipient vehicle 1210a-1210j may use the information contained within the response message along with the other information (e.g., characteristics of other vehicles, location information associated with a location or scene of the other vehicles, weather conditions, traffic conditions, etc.) to generate the dynamic neighbor list for itself.

In some cases, the network device 1230 can use the information contained within the one or more informational messages from the equipped vehicle 1210a-1210j, the other information (e.g., characteristics of other vehicles, location information associated with a location or scene of the other vehicles, weather conditions, traffic conditions, etc.), a quality of service (QOS) associated with each of the recipient vehicles, and performance parameters to determine which devices (e.g., vehicles or other devices, such as UEs, RSUs, network-connected infrastructure, etc.) can be recipient devices to which to send messages and/or when to transmit the response message to the recipient vehicles or other devices. Selectively transmitting messages to certain devices and/or at certain times can decrease load on the communications network (e.g., on the Uu interface), such as by transmitting only the most relevant messages to specific devices.

In some examples, the QoS is a level of service associated with a recipient device (e.g., from the equipped vehicles 1210a-1210j and/or other recipient device) that is related to a level of priority for which the recipient vehicle 1210a-1210j has for receiving messages. As such, for example, recipient vehicles that have a high QoS will have a higher priority to receive messages prior to recipient vehicles that have a low QoS. In some examples, the performance parameters may include an end-to-end latency threshold and/or an information age threshold. An end-to-end latency threshold specifies a predetermined threshold amount of time between when a response message is transmitted and when the response message is received. An information age threshold specifies a predetermined threshold amount of age (e.g., related to an amount of time or "freshness" or "staleness") of the vehicle information. In some examples, the network device 1230 may determine the transmission priority based on the severity of the message. For example, if an informational message or a response message contains a particular message (e.g., a do-not-pass warning (DNPW), a forward collision warning (FCW), etc.), the network device 1230 may choose to prioritize the transmission of a related response message.

In some examples, the network device 1230 can determine (e.g., when it is not urgent) to wait to send at least some of the one or more response messages to recipient devices (e.g., from the equipped vehicles 1210a-1210j and/or other recipient devices) to improve transmission efficiency. In such examples, the network device 1230 can bundle multiple response messages together and transmit them at the same time to the recipient devices. In some examples, the network device can use the information contained within the one or more informational messages from the one or more equipped vehicles 1210a-1210j, the other information (e.g., characteristics of other vehicles, location information associated with a location or scene of the other vehicles, weather conditions, traffic conditions, etc.), the QoS associated with each of the recipient devices, and the performance parameters to determine whether to bundle at least some of the response messages for transmission. For example, the network device 1230 can bundle response messages in order to meet QoS requirements, such as latency requirements.

In some cases, the network device 1230 may transmit the one or more response messages to the recipient devices via another network entity, such as a base station 1220 or portion thereof (e.g., one or more of a DU, CU, etc. of the base station 1220), as is shown in FIG. 12. In some examples, a gNB or an eNB having a monolithic or disaggregated base station architecture may be employed for the base station 1220. The network device 1230 and the base station 1220 may be co-located together or, alternatively, the network device 1230 and the base station 1220 may be located remote from one another. In some techniques, the base station 1220 may be used to determine whether to bundle some of the response messages for transmission. As noted above, in some cases, the equipped vehicles 1210a-1210j can communicate directly with the network device 1230, in which case the base station 1220 may or may not be involved in the exchange of messages between the equipped vehicles 1210a-1210j and the network device 1230.

Figure 13:
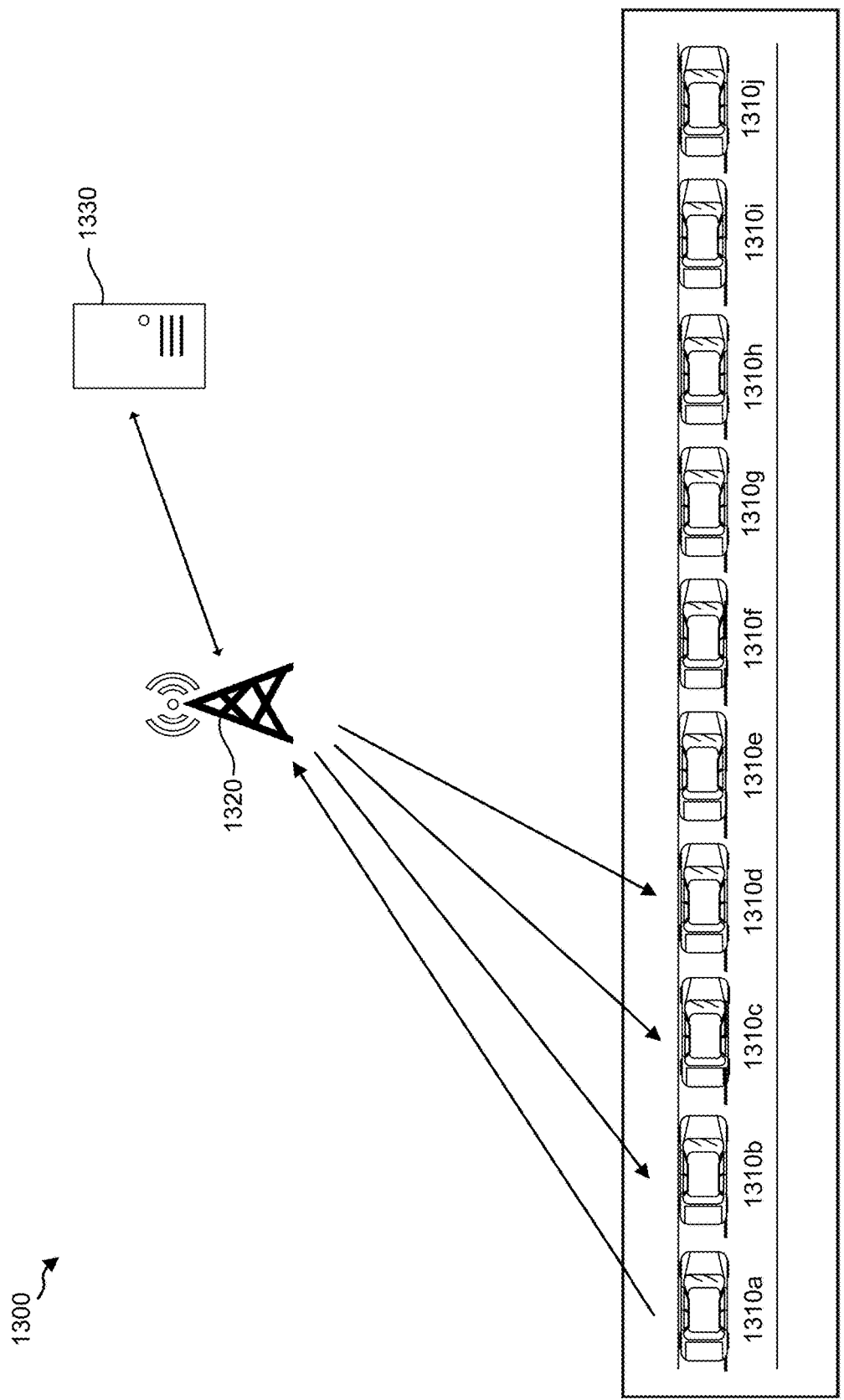
FIG. 13 is a diagram illustrating another example of a system for providing optimized vehicular-based messages (e.g., safety messages) to equipped vehicles (e.g., V2X enabled vehicles), in accordance with some aspects of the present disclosure.
Figure 14:
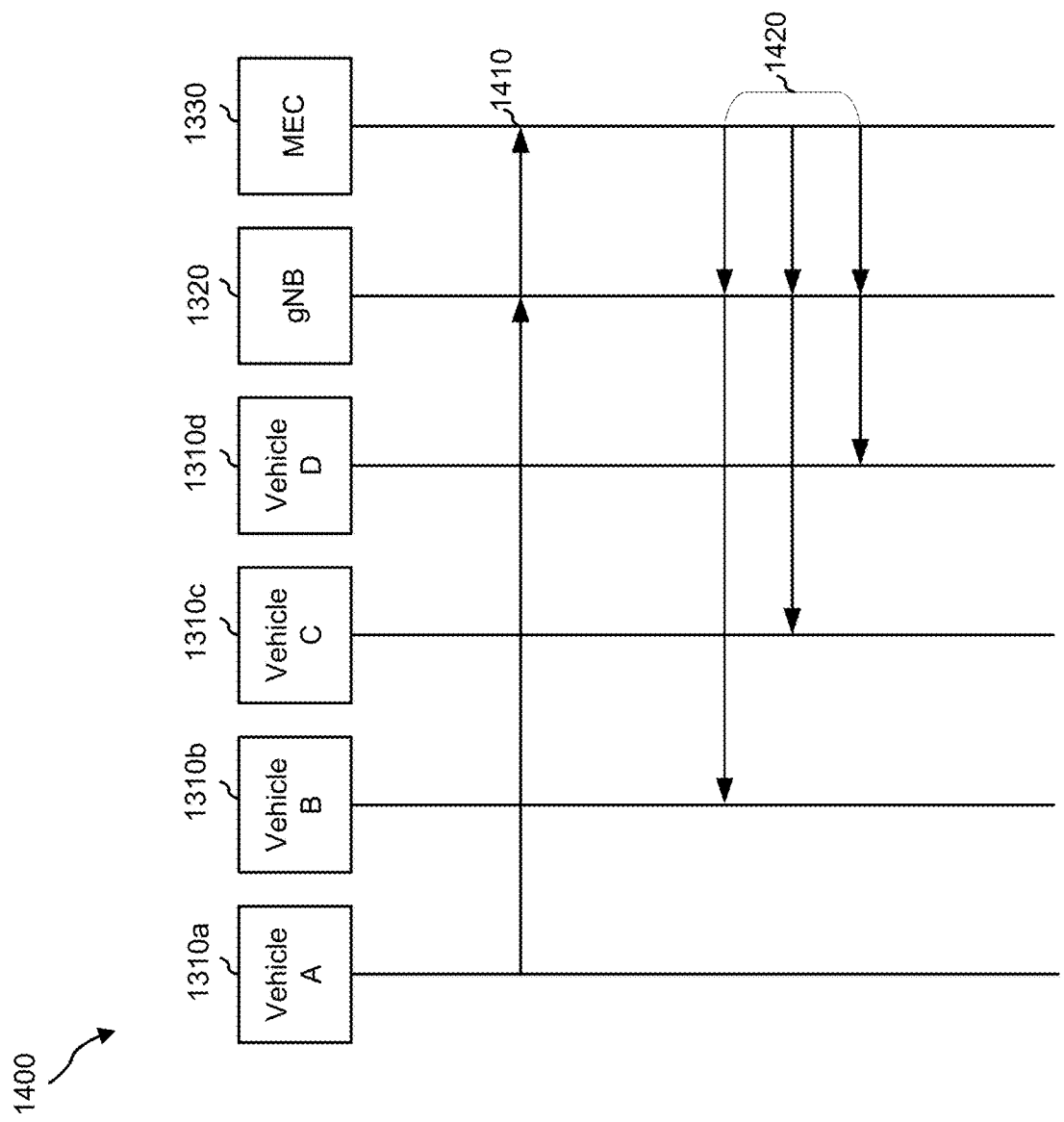
FIG. 14 is a diagram illustrating an example of a communication (e.g., a V2X communications) exchange for sharing vehicle information (e.g., vehicular-based messages) for the system of FIG. 13, in accordance with some aspects of the present disclosure.

FIG. 13 is a diagram illustrating the disclosed system 1300 for providing optimized vehicular-based messages (e.g., safety messages) to equipped vehicles 1310a, 1310b, 1310c, 1310d, 1310e, 1310f, 1310g, 1310h, 1310i, and 1310j (collectively referred to as equipped vehicles 1310a-1310j), in accordance with some aspects of the present disclosure. For instance, the system 1300 of FIG. 13 illustrates an example of the operation of the system 1200 of FIG. 12. FIG. 14 is a diagram of an example of a communication (e.g., a V2X communications) exchange 1400 for sharing vehicle information (e.g., vehicular-based messages) for the system 1300 of FIG. 13, and is described in conjunction with the description of FIG. 13.

In FIG. 13, the system 1300 may include the equipped vehicles 1310a-1310j, a base station 1320 (e.g., an eNB or gNB), and a network device 1330 (e.g., a MEC device). It should be noted that the disclosed system 1300 may have more or less equipped vehicles 1310a-1310j, base stations 1320, and/or network devices 1330 than as is shown in FIG. 13. The equipped vehicles 1310a, 1310b, 1310c, 1310d, 1310e, 1310f, 1310g, 1310h, 1310i, and 1310j may be V2X-equipped or enabled vehicles configured to communicate using any type of sidelink communication mechanism (e.g., C-V2X, DSRC, etc.).

During operation of the disclosed system 1300 of FIG. 13, the equipped vehicle 1210a (e.g., a V2X enabled vehicle) may transmit (e.g., transmission 1410 of FIG. 14) a first informational message, which is associated with the equipped vehicle 1210a, to the base station 1320 that is located within range of the equipped vehicle 1210a. The base station 1320 may transmit (e.g., transmission 1410 of FIG. 14) the first informational message to the network device 1330.

As shown in FIG. 13, the network device 1330 may send one or more response messages to recipient vehicles from the equipped vehicles 1310a-1310d. For instance, after the network device 1330 receives the first informational message from the base station 1320, the network device 1330 can use the information contained within the first informational message along with other information (e.g., characteristics of other vehicles, location information associated with a location or scene of the other vehicles, weather conditions, traffic conditions, etc.) to generate one or more response messages and to determine which equipped vehicles 1310a-1310j currently located within a communication range of the network device 1330 to transmit the one or more response messages containing the information of the vehicle 1310*a*. As shown in FIG. 14, the network device 1330 determines the equipped vehicles 1310*b*-1310*d* as those vehicles to which the one or more response messages will be transmitted (referred to herein as recipient vehicles 1310*b*-1310*d*). In doing so, the network device 1330 generates a customized group of recipient vehicles for the response messages and may also generate customized response messages for each of the recipient vehicles 1310*b*-1310*d*.

The selected recipient vehicles 1310*b*-1310*d* are equipped vehicles 1310*a*-1310*j* that the network device 1330 determines would find the information related to equipped vehicle 1310*a* to be relevant to themselves. For example, equipped vehicle 1310*e* is not determined to be a recipient vehicle 1310*b*-1310*d* because equipped vehicle 1310*e* is located too far away from equipped vehicle 1310*a* to find information regarding 1310*a* to be relevant. Then, after the network device 1330 generates the one or more response messages and determines the recipient vehicles 1310*b*-1310*d*, the network device 1330 may transmit (e.g., transmissions 1420 of FIG. 14) the one or more response messages to the determined recipient vehicles 1310*b*-1310*d* via the base station 1320.

Figure 15:
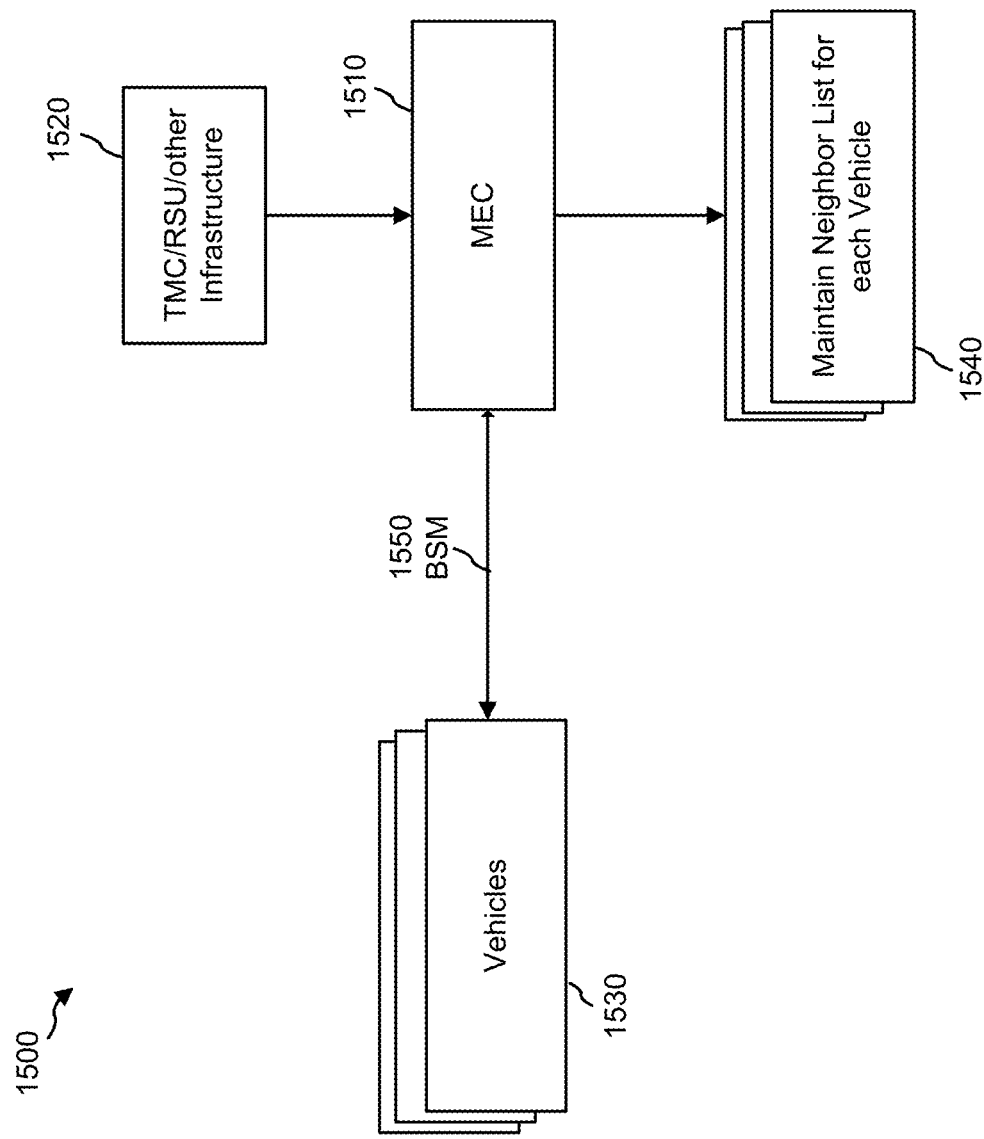
FIG. 15 is a diagram illustrating an example of a network device processing data for generating a neighbor list for equipped vehicles (e.g., V2X enabled vehicles), in accordance with some aspects of the present disclosure.

FIG. 15 is a diagram illustrating the processing of data by a network device (e.g., a MEC) 1510 of the disclosed system for generating a neighbor list for equipped vehicles (e.g., V2X enabled vehicles) 1530, in accordance with some aspects of the present disclosure. During operation of the disclosed system (e.g., system 1200 of FIG. 12), the network device (e.g., a MEC) 1510 may receive and analyze information received from a variety of different sources to generate and maintain a dynamic neighbor list for each of the vehicles 1540.

In FIG. 15, in one or more examples, the network device (e.g., MEC) 1510 may receive information from a plurality of sources, which may include the vehicles 1530 (e.g., information received via a BSM 1550 transmitted from each of the vehicles 1530) as well as a TMC, a RSU, and/or other infrastructure (e.g., which may include sensors on infrastructure) 1520. The information from each of the vehicles 1530 may include, but is not limited to, a position of the vehicle, an accuracy of the position, a speed of the vehicle, a direction in which the vehicle is traveling, an event (e.g., braking) of the vehicle, and/or other information related to the vehicle. And, the information from the TMC, RSU, and/or other infrastructure 1520 may include, but is not limited to, traffic conditions (e.g., low speed and/or dense traffic, high speed traffic, information related to an accident, etc.), weather conditions (e.g., rain, snow, etc.), message type (e.g., an emergency message, a non-emergency or "regular" message), etc.), road topology (line-of-sight (LOS) or non-LOS (NLOS), etc.), anticipating use case (e.g., DNPW or FCW), any combination, thereof, and/or other information.

Once the network device 1510 has received the information from the different sources, the network device 1510 may utilize at least a portion of the received information to generate and maintain dynamic neighbor lists for each of the vehicles 1540. For example, each dynamic neighbor list may include a listing of all of the vehicles 1530 that are located within a specific predetermined distance (or radius of distance) away from a corresponding vehicle 1530.

Figure 16:
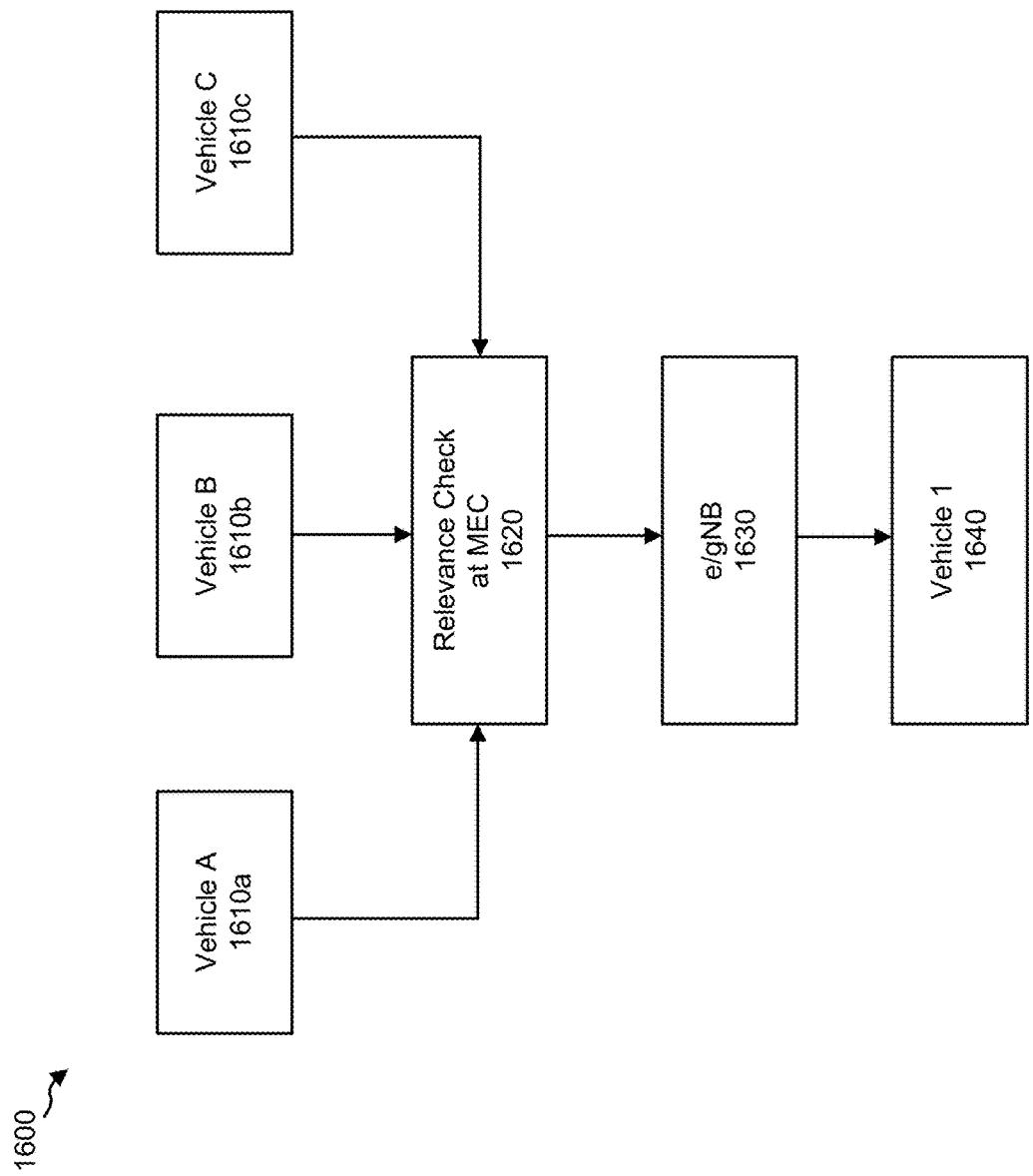
FIG. 16 is a diagram illustrating an example of a network device processing data for providing optimized vehicular-based messages (e.g., safety messages) to equipped vehicles (e.g., V2X enabled vehicles), in accordance with some aspects of the present disclosure.

FIG. 16 is a diagram 1600 illustrating the processing of data by a network device (e.g., a MEC) of the disclosed system for providing optimized vehicular-based messages (e.g., safety messages) to equipped vehicles (e.g., V2X enabled vehicles) 1610*a*, 1610*b*, 1610*c*, 1640, in accordance with some aspects of the present disclosure. In FIG. 16, equipped vehicles 1610*a*, 1610*b*, 1610*c* may transmit one or more informational messages to the network device. After receiving the one or more informational messages, the network device (e.g., MEC) may use information (e.g., vehicle information) contained within the one or more informational messages to perform a relevance check (e.g., by running ITS stack functionality) 1620 regarding the dynamic neighbor lists for each of the equipped vehicles 1610*a*, 1610*b*, 1610*c*, 1640. The network device may then update the dynamic neighbor list for each of the equipped vehicles 1610*a*, 1610*b*, 1610*c*, 1640 according to at least some of the information in the one or more informational messages. For example, the equipped vehicles 1610*a*, 1610*b*, 1610*c* may be members of the dynamic neighbor list for the equipped vehicle 1640.

The network device may then combine multiple response messages (e.g., containing the updated dynamic neighbor lists) for each of the equipped vehicles 1610*a*, 1610*b*, 1610*c*, 1640, and may transmit the bundled response messages (e.g., via a Uu interface) to a base station (e.g., eNB or gNB) 1630. The network device may also specify to the base station a priority of transmission for the response messages for each of the equipped vehicles 1610*a*, 1610*b*, 1610*c*, 1640. The priority of transmission may be related to a QoS associated with each of the equipped vehicles 1610*a*, 1610*b*, 1610*c*, 1640. For example, if the equipped vehicle 1640 has a higher level of QoS than equipped vehicles the 1610*a*, 1610*b*, 1610*c*, the base station may choose to transmit a response message (e.g. containing the updated dynamic neighbor list) to the equipped vehicle 1640 before transmitting one or more other response messages to the equipped vehicles 1610*a*, 1610*b*, 1610*c*.

Figure 17:
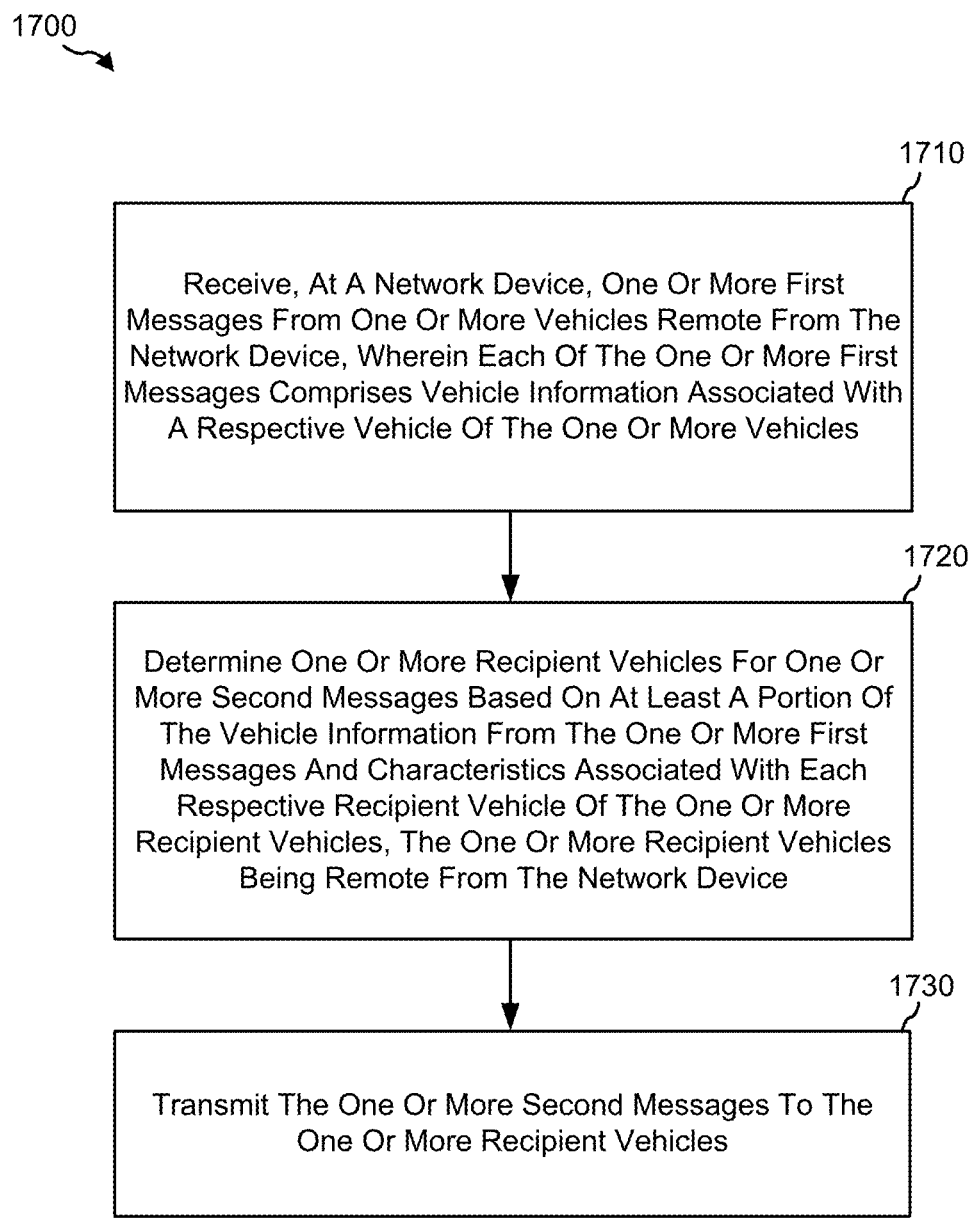
FIG. 17 is a flow diagram illustrating an example of a process for wireless communications by a network entity, in accordance with some aspects of the present disclosure.

FIG. 17 is a flow diagram of an example process 1700 for wireless communications at a network entity, in accordance with some aspects of the present disclosure. The process 1700 can be performed by a network device (e.g., a MEC, an eNB, a gNB, a location server such as an LMF, or a portion thereof, such as one or more of a CU, a DU, a RU, a Near-RT RIC, or a Non-RT RIC) or by a component or system (e.g., a chipset) of the network device. The operations of the process 1700 may be implemented as software components that are executed and run on one or more controllers or processors (e.g., the control system 452 of FIG. 4, the processor 1810 of FIG. 18 or other processor(s)). Further, the transmission and reception of signals by the network entity in the process 1700 may be enabled, for example, by one or more antennas and/or one or more transceivers (e.g., wireless transceiver(s) of the communications system 458 of FIG. 4, wireless transceiver(s) of the communications interface 1840 of FIG. 18, etc.).

At block 1710, the network device (or portion thereof) may receive one or more first messages (e.g., one or more informational messages, as described above) from one or more vehicles remote from the network device. Each of the one or more first messages includes vehicle information associated with a respective vehicle of the one or more vehicles. In some aspects, the vehicle information includes a position of each respective vehicle of the one or more vehicles, an accuracy of the position, a direction of each respective vehicle, a speed of each respective vehicle, one or more capabilities of each respective vehicle, a message filtering request by each respective vehicle, a safety warning from each respective vehicle, any combination thereof, and/or other information associated with a vehicle from the one or more vehicles. In some cases, the one or more capabilities may include processing capabilities of each respective vehicle, a thermal status of each respective vehicle, a state of health of each respective vehicle, any combination thereof, and/or other capability. In some examples, the safety warning a do not pass warning (DNPW), a forward collision warning (FCW), and/or any other type of safety warning.

At block 1720, the network device (or portion thereof) may determine one or more recipient vehicles for one or more second messages (e.g., one or more response messages, as described above) based on at least a portion of the vehicle information from the one or more first messages and characteristics associated with a respective recipient vehicle of the one or more recipient vehicles. The one or more recipient vehicles are remote from the network device. In some aspects, the characteristics associated with each respective recipient vehicle of the one or more recipient vehicles includes a quality of service associated with each respective recipient vehicle of the one or more recipient vehicles, one or more performance parameters associated with the one or more recipient vehicles, a combination thereof, and/or other characteristics associated with each recipient vehicle. In some aspects, the quality of service includes a message priority. For instance, in such examples, the network device (or portion thereof) may transmit (or output for transmission) the one or more second messages to at least one of the one or more recipient vehicles having a higher level of message priority before at least one other of the one or more recipient vehicles having a lower level of message priority. In some examples, the one or more performance parameters include an end-to-end latency threshold and/or an information age threshold. For instance, as described herein, the end-to-end latency threshold specifies a threshold amount of time between when the one or more second messages are transmitted and when the one or more second messages are received. As further described herein, the information age threshold specifies a threshold amount of age of information from each respective recipient vehicle.

In some cases, the characteristics associated with each respective recipient vehicle further include a position of each respective recipient vehicle, an accuracy of the position, a speed of each respective recipient vehicle, one or more capabilities of each respective recipient vehicle, a message filtering request by each respective recipient vehicle, a safety warning from each respective recipient vehicle (e.g., a DNPW, FCW, and/or other type of safety warning), a combination thereof, and/or other characteristics associated with each recipient vehicle. In some examples, the one or more capabilities of each respective recipient vehicle includes processing capabilities of each respective recipient vehicle, a thermal status of each respective recipient vehicle, a state of health of each respective recipient vehicle, any combination thereof, and/or other capability.

In some aspects, the network device (or portion thereof) may determine the one or more recipient vehicles for the one or more second messages further based on additional information associated with each respective recipient vehicle of the one or more recipient vehicles. For instance, the additional information may include weather information, traffic information, lighting conditions information, road topology information, preference information (e.g., a particular vehicle's preference of whether to receive informational messages from other vehicles), obstructions information, any combination thereof, and/or other information.

In some aspects, the network device (or portion thereof) may generate a dynamic neighbor list (also referred to as a local dynamic map (LDM), as noted previously) for each of the one or more recipient vehicles based on at least a portion of the vehicle information from the one or more first messages and based on the characteristics associated with the one or more recipient vehicles. In some aspects, the network device (or portion thereof) may generate a dynamic neighbor list (or LDM) for each of the one or more vehicles based on at least a portion of the vehicle information from the one or more first messages and based on the characteristics associated with each respective recipient vehicle of the one or more recipient vehicles. As described previously, the network device (or portion thereof) may use the neighbor list(s) generated for the one or more recipient vehicles and/or the neighbor list(s) generated for the one or more vehicles transmitting the one or more first messages (e.g., informational messages) to determine the one or more recipient vehicles for the one or more second messages. In one example, the network device (or portion thereof) may determine the one or more recipient vehicles for the one or more second messages based on at least the portion of the vehicle information from the one or more first messages and the dynamic neighbor list generated for each of the one or more recipient vehicles. In another example, the network device (or portion thereof) may determine the one or more recipient vehicles based on at least the portion of the vehicle information and the dynamic neighbor list generated for each of the one or more recipient vehicles.

At block 1730, the network device (or portion thereof) may transmit (or output for transmission) the one or more second messages to the one or more recipient vehicles. In some aspects, the one or more first messages and the one or more second messages are vehicular-based messages. For instance, the one or more first messages may include a basic safety message (BSM), a cooperative awareness message (CAM), a sensor data sharing message (SDSM), any combination thereof, and/or other vehicular-based message. In some cases, the network device (or portion thereof) may transmit (or output for transmission) the one or more second messages to the one or more recipient vehicles via a network entity (e.g., over a Uu interface). The network device (or portion thereof) may also receive the one or more first messages over the Uu interface. For instance, the network entity may be a base station (e.g., a gNB, an eNB, etc.) or a portion thereof (e.g., one or more of a CU, a DU, a RU, a Near-RT RIC, or a Non-RT RIC). In some cases, as described herein, the network device (e.g., a MEC) and the network entity (e.g., a base station or portion thereof) are remote from each other. In other cases, as described herein, the network device (e.g., a MEC) and the network entity (e.g., a base station or portion thereof) are co-located with one another. For example, the one or more recipient vehicles are located within a communication range of the network device if the network device and the network entity are co-located. In another example, the one or more recipient vehicles are located within a communication range of the network entity if the network device and the network entity are remote from each other.

In some examples, the network device (or portion thereof) may bundle messages from the one or more second messages based on the vehicle information (or a portion thereof) from the one or more first messages and the characteristics associated with each respective recipient vehicle of the one or more recipient vehicles. For example, the network device (or portion thereof) may bundle a plurality of messages from the one or more second messages for transmission to a recipient vehicle based on the plurality of messages being from at least one vehicle in a dynamic neighbor list of the recipient vehicle, based on a quality of service associated with the plurality of messages, based on content of the plurality of messages (e.g., by bundling relevant messages for the same receiving vehicle), any combination thereof, and/or based on other factors. The network device (or portion thereof) may transmit (or output for transmission) the one or more second messages to the one or more recipient vehicles by transmitting (or outputting for transmission) the bundled messages to the one or more recipient vehicles.

While examples are described with respect to the process 1700 using vehicles as illustrative examples of devices from which to receive the one or more first messages (e.g., informational messages) and recipient devices determined to receive the response messages, the process 1700 also applies to other types of recipient devices (e.g., recipient RSUs, recipient pedestrian devices/UEs, recipient network-connected infrastructure devices, etc.) in addition to or as an alternative to recipient vehicles. For example, the network device (or portion thereof) may determine one or more recipient user devices for the one or more second messages based on at least the portion of the vehicle information from the one or more first messages and characteristics associated with each of the one or more recipient user devices. The network device (or portion thereof) may transmit the one or more second messages to the one or more recipient user devices. In another example, the network device (or portion thereof) may receive the one or more first messages (or other messages) from one or more user devices other than vehicles, where each of the messages from the one or more user devices includes characteristics associated with each of the user devices.

Figure 18:
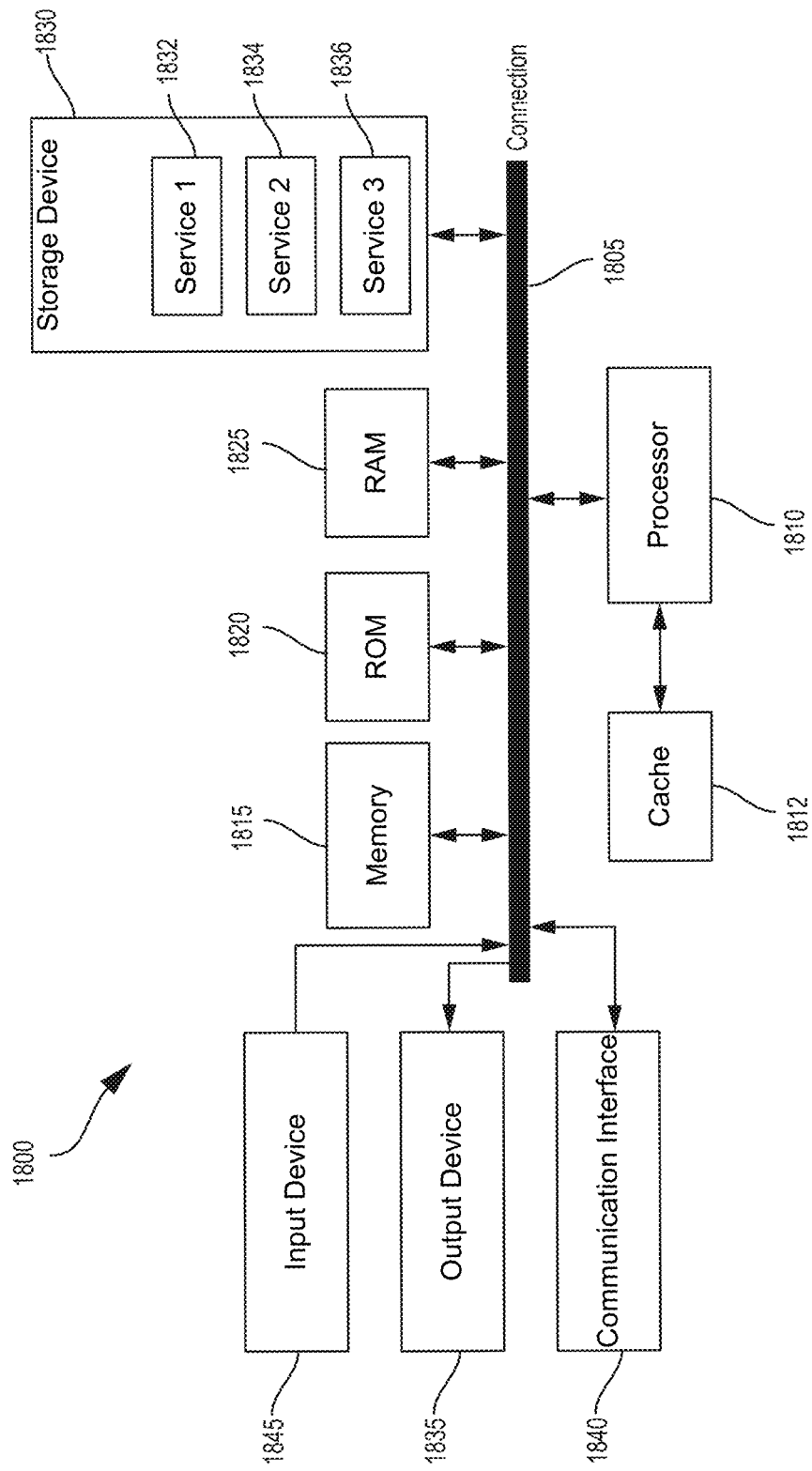
FIG. 18 is a block diagram illustrating an example of a computing system, in accordance with some aspects of the present disclosure.

FIG. 18 is a diagram illustrating an example of a system for implementing certain aspects of the present technology. In particular, FIG. 18 illustrates an example of computing system 1800, which can be for example any computing device making up internal computing system, a remote computing system, a camera, or any component thereof in which the components of the system are in communication with each other using connection 1805. Connection 1805 can be a physical connection using a bus, or a direct connection into processor 1810, such as in a chipset architecture. Connection 1805 can also be a virtual connection, networked connection, or logical connection.

In some aspects, computing system 1800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1800 includes at least one processing unit (CPU or processor) 1810 and connection 1805 that communicatively couples various system components including system memory 1815, such as read-only memory (ROM) 1820 and random access memory (RAM) 1825 to processor 1810. Computing system 1800 can include a cache 1812 of high-speed memory connected directly with, in close proximity to, or integrated as part of processor 1810.

Processor 1810 can include any general purpose processor and a hardware service or software service, such as services 1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms. In some instances, multimodal systems can enable a user to provide multiple types of input/output to communicate with computing system 1800.

Computing system 1800 can include communications interface 1840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1840 may also include one or more Global Navigation Satellite System (GNSS) receivers or transceivers that are used to determine a location of the computing system 1800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1830 can include software services, servers, services, etc., that when the code that defines such software is executed by the processor 1810, it causes the system to perform a function. In some aspects, a hardware service that performs a particular function can include the software component stored in a computer-readable medium in connection with the necessary hardware components, such as processor 1810, connection 1805, output device 1835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method for wireless communications at a network device, the method comprising: receiving, at the network device, one or more first messages from one or more vehicles remote from the apparatus, wherein each of the one or more first messages comprises vehicle information associated with a respective vehicle of the one or more vehicles: determining, at the network device, one or more recipient vehicles for one or more second messages based on at least a portion of the vehicle information from the one or more first messages and characteristics associated with a respective recipient vehicle of the one or more recipient vehicles, the one or more recipient vehicles being remote from the apparatus; and transmitting, at the network device, the one or more second messages to the one or more recipient vehicles.

Aspect 2. The method of Aspect 1, wherein the one or more first messages and the one or more second messages are vehicular-based messages.

Aspect 3. The method of any of Aspects 1 or 2, wherein the one or more first messages comprise at least one of a basic safety message (BSM) or a cooperative awareness message (CAM).

Aspect 4. The method of any of Aspects 1 to 3, wherein the network device is a multi-access edge computing (MEC) device.

Aspect 5. The method of any of Aspects 1 to 4, wherein the vehicle information comprises at least one of a position of each respective vehicle of the one or more vehicles, an accuracy of the position, a direction of each respective vehicle, a speed of each respective vehicle, one or more capabilities of each respective vehicle, a message filtering request by each respective vehicle, or a safety warning from each respective vehicle.

Aspect 6. The method of Aspect 5, wherein the one or more capabilities comprise at least one of processing capabilities of each respective vehicle, a thermal status of each respective vehicle, or a state of health of each respective vehicle.

Aspect 7. The method of any of Aspects 5 or 6, wherein the safety warning comprises at least one of a do not pass warning (DNPW) or a forward collision warning (FCW).

Aspect 8. The method of any of Aspects 1 to 7, wherein the one or more recipient vehicles for the one or more second messages are determined further based on additional information associated with each respective recipient vehicle of the one or more recipient vehicles, the additional information comprising at least one of weather information, traffic information, lighting conditions information, road topology information, preference information, or obstructions information.

Aspect 9. The method of any of Aspects 1 to 8, further comprising generating a dynamic neighbor list for each of the one or more recipient vehicles based on at least a portion of the vehicle information from the one or more first messages and based on the characteristics associated with the one or more recipient vehicles, wherein determining the one or more recipient vehicles for the one or more second messages includes determining the one or more recipient vehicles based on at least the portion of the vehicle information from the one or more first messages and the dynamic neighbor list generated for each of the one or more recipient vehicles.

Aspect 10. The method of any of Aspects 1 to 9, further comprising generating a dynamic neighbor list for each of the one or more vehicles based on at least a portion of the vehicle information from the one or more first messages and based on the characteristics associated with each respective recipient vehicle of the one or more recipient vehicles, wherein determining the one or more recipient vehicles for the one or more second messages includes determining the one or more recipient vehicles based on at least the portion of the vehicle information and the dynamic neighbor list generated for each of the one or more recipient vehicles.

Aspect 11. The method of any of Aspects 1 to 10, wherein the characteristics associated with each respective recipient vehicle of the one or more recipient vehicles comprises at least one of a quality of service associated with each respective recipient vehicle of the one or more recipient vehicles or one or more performance parameters associated with the one or more recipient vehicles.

Aspect 12. The method of Aspect 11, wherein the characteristics associated with each respective recipient vehicle of the one or more recipient vehicles further comprises at least one of a position of each respective recipient vehicle, an accuracy of the position, a speed of each respective recipient vehicle, one or more capabilities of each respective recipient vehicle, a message filtering request by each respective recipient vehicle, or a safety warning from each respective recipient vehicle.

Aspect 13. The method of Aspect 12, wherein the one or more capabilities of each respective recipient vehicle comprise at least one of processing capabilities of each respective recipient vehicle, a thermal status of each respective recipient vehicle, or a state of health of each respective recipient vehicle.

Aspect 14. The method of any of Aspects 12 or 13, wherein the safety warning comprises at least one of a do not pass warning (DNPW) or a forward collision warning (FCW).

Aspect 15. The method of any of Aspects 11 to 14, wherein the quality of service comprises a message priority, and wherein the one or more second messages are sent to at least one of the one or more recipient vehicles having a higher level of message priority before at least one other of the one or more recipient vehicles having a lower level of message priority.

Aspect 16. The method of any of Aspects 11 to 15, wherein the one or more performance parameters comprise at least one of an end-to-end latency threshold or an information age threshold.

Aspect 17. The method of Aspect 16, wherein the end-to-end latency threshold specifies a threshold amount of time between when the one or more second messages are transmitted and when the one or more second messages are received.

Aspect 18. The method of any of Aspects 16 or 17, wherein the information age threshold specifies a threshold amount of age of information from each respective recipient vehicle.

Aspect 19. The method of any of Aspects 1 to 18, further comprising: bundling at least some of the one or more second messages based on at least a portion of the vehicle information from the one or more first messages and the characteristics associated with each respective recipient vehicle of the one or more recipient vehicles: wherein transmitting the one or more second messages to the one or more recipient vehicles includes transmitting the bundled at least some of the one or more second messages to the one or more recipient vehicles.

Aspect 20. The method of Aspect 19, wherein bundling at least some of the one or more second messages comprises: bundling a plurality of messages from the one or more second messages for transmission to a recipient vehicle based on at least one of the plurality of messages being from at least one vehicle in a dynamic neighbor list of the recipient vehicle, a quality of service associated with the plurality of messages, or content of the plurality of messages.

Aspect 21. The method of any of Aspects 1 to 20, wherein the one or more second messages are transmitted to the one or more recipient vehicles via a network entity.

Aspect 22. The method of Aspect 21, wherein the network entity is a base station.

Aspect 23. The method of Aspect 22, wherein the base station is one of a gNodeB (gNB) or an evolved NodeB (eNB).

Aspect 24. The method of any of Aspects 21 to 23, wherein the network device and the network entity are one of remote from each other or co-located, wherein the one or more recipient vehicles are located within a communication range of the network device if the network device and the network entity are co-located or wherein the one or more recipient vehicles are located within a communication range of the network entity if the network device and the network entity are remote from each other.

Aspect 25. The method of any of Aspects 1 to 24, wherein the one or more first messages are received over a wide area network (Uu) interface, and wherein the one or more second messages are transmitted over the Uu interface.

Aspect 26. The method of any of Aspects 1 to 25, further comprising: determining one or more recipient user devices for the one or more second messages based on at least the portion of the vehicle information from the one or more first messages and characteristics associated with each of the one or more recipient user devices; and transmitting the one or more second messages to the one or more recipient user devices.

Aspect 27. The method of any of Aspects 1 to 26, further comprising: receiving one or more third messages from one or more user devices, where each of the messages from the one or more user devices includes characteristics associated with each of the one or more user devices.

Aspect 28. An apparatus for wireless communications, comprising: at least one memory; and at least one processor coupled to the at least one memory and configured to: receive one or more first messages from one or more vehicles remote from the apparatus, wherein each of the one or more first messages comprises vehicle information associated with a respective vehicle of the one or more vehicles: determine one or more recipient vehicles for one or more second messages based on at least a portion of the vehicle information from the one or more first messages and characteristics associated with a respective recipient vehicle of the one or more recipient vehicles, the one or more recipient vehicles being remote from the apparatus; and output the one or more second messages for transmission to the one or more recipient vehicles.

Aspect 29. The apparatus of Aspect 28, wherein the one or more first messages and the one or more second messages are vehicular-based messages.

Aspect 30. The apparatus of any of Aspects 28 or 29, wherein the one or more first messages comprise at least one of a basic safety message (BSM) or a cooperative awareness message (CAM).

Aspect 31. The apparatus of any of Aspects 28 to 30, wherein the apparatus is a multi-access edge computing (MEC) device.

Aspect 32. The apparatus of any of Aspects 28 to 31, wherein the vehicle information comprises at least one of a position of each respective vehicle of the one or more vehicles, an accuracy of the position, a direction of each respective vehicle, a speed of each respective vehicle, one or more capabilities of each respective vehicle, a message filtering request by each respective vehicle, or a safety warning from each respective vehicle.

Aspect 33. The apparatus of Aspect 32, wherein the one or more capabilities comprise at least one of processing capabilities of each respective vehicle, a thermal status of each respective vehicle, or a state of health of each respective vehicle.

Aspect 34. The apparatus of any of Aspects 32 or 33, wherein the safety warning comprises at least one of a do not pass warning (DNPW) or a forward collision warning (FCW).

Aspect 35. The apparatus of any of Aspects 28 to 34, wherein the one or more recipient vehicles for the one or more second messages are determined further based on additional information associated with each respective recipient vehicle of the one or more recipient vehicles, the additional information comprising at least one of weather information, traffic information, lighting conditions information, road topology information, preference information, or obstructions information.

Aspect 36. The apparatus of any of Aspects 28 to 35, wherein the at least one processor is configured to: generate a dynamic neighbor list for each of the one or more recipient vehicles based on at least a portion of the vehicle information from the one or more first messages and based on the characteristics associated with the one or more recipient vehicles; and determine the one or more recipient vehicles based on at least the portion of the vehicle information from the one or more first messages and the dynamic neighbor list generated for each of the one or more recipient vehicles.

Aspect 37. The apparatus of any of Aspects 28 to 36, wherein the at least one processor is configured to: generate a dynamic neighbor list for each of the one or more vehicles based on at least a portion of the vehicle information from the one or more first messages and based on the characteristics associated with each respective recipient vehicle of the one or more recipient vehicles; and determine the one or more recipient vehicles based on at least the portion of the vehicle information and the dynamic neighbor list generated for each of the one or more recipient vehicles.

Aspect 38. The apparatus of any of Aspects 28 to 37, wherein the characteristics associated with each respective recipient vehicle of the one or more recipient vehicles comprises at least one of a quality of service associated with each respective recipient vehicle of the one or more recipient vehicles or one or more performance parameters associated with the one or more recipient vehicles.

Aspect 39. The apparatus of Aspect 38, wherein the characteristics associated with each respective recipient vehicle of the one or more recipient vehicles further comprises at least one of a position of each respective recipient vehicle, an accuracy of the position, a speed of each respective recipient vehicle, one or more capabilities of each respective recipient vehicle, a message filtering request by each respective recipient vehicle, or a safety warning from each respective recipient vehicle.

Aspect 40. The apparatus of Aspect 39, wherein the one or more capabilities of each respective recipient vehicle comprise at least one of processing capabilities of each respective recipient vehicle, a thermal status of each respective recipient vehicle, or a state of health of each respective recipient vehicle.

Aspect 41. The apparatus of any of Aspects 39 or 40, wherein the safety warning comprises at least one of a do not pass warning (DNPW) or a forward collision warning (FCW).

Aspect 42. The apparatus of any of Aspects 38 to 41, wherein the quality of service comprises a message priority, and wherein the at least one processor is configured to output the one or more second messages for transmission to at least one of the one or more recipient vehicles having a higher level of message priority before at least one other of the one or more recipient vehicles having a lower level of message priority.

Aspect 43. The apparatus of any of Aspects 38 to 42, wherein the one or more performance parameters comprise at least one of an end-to-end latency threshold or an information age threshold.

Aspect 44. The apparatus of Aspect 43, wherein the end-to-end latency threshold specifies a threshold amount of time between when the one or more second messages are transmitted and when the one or more second messages are received.

Aspect 45. The apparatus of any of Aspects 43 or 44, wherein the information age threshold specifies a threshold amount of age of information from each respective recipient vehicle.

Aspect 46. The apparatus of any of Aspects 28 to 45, wherein: the at least one processor is configured to bundle at least some of the one or more second messages based on at least a portion of the vehicle information from the one or more first messages and the characteristics associated with each respective recipient vehicle of the one or more recipient vehicles: wherein, to output the one or more second messages for transmission to the one or more recipient vehicles, the at least one processor is configured to output the bundled at least some of the one or more second messages for transmission to the one or more recipient vehicles.

Aspect 47. The apparatus of Aspect 46, wherein, to bundle at least some of the one or more second messages, the at least one processor is configured to: bundle a plurality of messages from the one or more second messages for transmission to a recipient vehicle based on at least one of the plurality of messages being from at least one vehicle in a dynamic neighbor list of the recipient vehicle, a quality of service associated with the plurality of messages, or content of the plurality of messages.

Aspect 48. The apparatus of any of Aspects 28 to 47, wherein the at least one processor is configured to output the one or more second messages for transmission to the one or more recipient vehicles via a network entity.

Aspect 49. The apparatus of Aspect 48, wherein the network entity is a base station.

Aspect 50. The apparatus of Aspect 49, wherein the base station is one of a gNodeB (gNB) or an evolved NodeB (eNB).

Aspect 51. The apparatus of any of Aspects 48 to 50, wherein the apparatus and the network entity are one of remote from each other or co-located, wherein the one or more recipient vehicles are located within a communication range of the network device if the network device and the network entity are co-located or wherein the one or more recipient vehicles are located within a communication range of the network entity if the network device and the network entity are remote from each other.

Aspect 52. The apparatus of any of Aspects 28 to 51, wherein the one or more first messages are received over a wide area network (Uu) interface, and wherein the one or more second messages are transmitted over the Uu interface.

Aspect 53. The apparatus of any of Aspects 28 to 52, wherein the apparatus is configured as a network entity, and further comprising: a transceiver configured to receive the one or more first messages and transmit the one or more second messages to the one or more recipient vehicles.

Aspect 54. The method of any of Aspects 28 to 53, wherein the at least one processor is configured to: determine one or more recipient user devices for the one or more second messages based on at least the portion of the vehicle information from the one or more first messages and characteristics associated with each of the one or more recipient user devices; and output the one or more second messages for transmission to the one or more recipient user devices.

Aspect 55. The method of any of Aspects 28 to 54, wherein the at least one processor is configured to: receive one or more third messages from one or more user devices, where each of the messages from the one or more user devices includes characteristics associated with each of the one or more user devices.

Aspect 56. A non-transitory computer-readable medium of a network entity having stored thereon instructions that, when executed by one or more processors, cause the one or more processors to perform operations according to any of Aspects 1 to 55.

Aspect 57. An apparatus for wireless communications comprising one or more means for performing operations according to any of Aspects 1 to 55.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for wireless communications at a network device, the method comprising:
   receiving, at the network device, one or more first messages from one or more vehicles remote from the network device, wherein each of the one or more first messages comprises vehicle information associated with a respective vehicle of the one or more vehicles;
   generating, at the network device, a respective dynamic neighbor list for each vehicle of the one or more vehicles based on at least a portion of the vehicle information from the one or more first messages, wherein a dynamic neighbor list for a vehicle of the one or more vehicles comprises a listing of vehicles that are located within a particular distance from the vehicle;
   determining, at the network device, one or more recipient vehicles for one or more second messages based on the respective dynamic neighbor list generated for each vehicle of the one or more vehicles, at least a portion of the vehicle information from the one or more first messages, and characteristics associated with each respective recipient vehicle of the one or more recipient vehicles, the one or more recipient vehicles being remote from the network device, wherein the one or more second messages are based on the one or more first messages, each second message of the one or more second messages including a dynamic neighbor list for at least one vehicle of the one or more recipient vehicles; and transmitting, at the network device, the one or more second messages to the one or more recipient vehicles, wherein the one or more recipient vehicles are out of vehicle-to-everything (V2X) communication range of the one or more vehicles.

2. The method of claim 1, wherein the one or more first messages and the one or more second messages are vehicular-based messages.

3. The method of claim 1, wherein the one or more first messages comprise at least one of a basic safety message (BSM) or a cooperative awareness message (CAM).

4. The method of claim 1, wherein the network device is a multi-access edge computing (MEC) device.

5. The method of claim 1, wherein the vehicle information comprises at least one of a position of each respective vehicle of the one or more vehicles, an accuracy of the position, a direction of each respective vehicle, a speed of each respective vehicle, one or more capabilities of each respective vehicle, a message filtering request by each respective vehicle, or a safety warning from each respective vehicle.

6. The method of claim 5, wherein the one or more capabilities comprise at least one of processing capabilities of each respective vehicle, a thermal status of each respective vehicle, or a state of health of each respective vehicle.

7. The method of claim 5, wherein the safety warning comprises at least one of a do not pass warning (DNPW) or a forward collision warning (FCW).

8. The method of claim 1, wherein the one or more recipient vehicles for the one or more second messages are determined further based on additional information associated with each respective recipient vehicle of the one or more recipient vehicles, the additional information comprising at least one of weather information, traffic information, lighting conditions information, road topology information, preference information, or obstructions information.

9. The method of claim 1, further comprising generating a respective dynamic neighbor list for each vehicle of the one or more recipient vehicles based on at least a portion of the vehicle information from the one or more first messages and based on the characteristics associated with each respective recipient vehicle of the one or more recipient vehicles, wherein the one or more recipient vehicles for the one or more second messages are determined further based on the respective dynamic neighbor list generated for each vehicle of the one or more recipient vehicles.

10. The method of claim 1, further comprising generating the respective dynamic neighbor list for each vehicle of the one or more vehicles further based on the characteristics associated with each respective recipient vehicle of the one or more recipient vehicles.

11. The method of claim 1, wherein the characteristics associated with each respective recipient vehicle of the one or more recipient vehicles comprises at least one of a quality of service associated with each respective recipient vehicle of the one or more recipient vehicles or one or more performance parameters associated with the one or more recipient vehicles.

12. The method of claim 11, wherein the characteristics associated with each respective recipient vehicle of the one or more recipient vehicles further comprises at least one of a position of each respective recipient vehicle, an accuracy of the position, a speed of each respective recipient vehicle, one or more capabilities of each respective recipient vehicle, a message filtering request by each respective recipient vehicle, or a safety warning from each respective recipient vehicle.

13. The method of claim 12, wherein the one or more capabilities of each respective recipient vehicle comprise at least one of processing capabilities of each respective recipient vehicle, a thermal status of each respective recipient vehicle, or a state of health of each respective recipient vehicle.

14. The method of claim 11, wherein the quality of service comprises a message priority, and wherein the one or more second messages are sent to at least one of the one or more recipient vehicles having a higher level of message priority before at least one other of the one or more recipient vehicles having a lower level of message priority.

15. The method of claim 11, wherein the one or more performance parameters comprise at least one of an end-to-end latency threshold or an information age threshold.

16. The method of claim 15, wherein the end-to-end latency threshold specifies a threshold amount of time between when the one or more second messages are transmitted and when the one or more second messages are received.

17. The method of claim 15, wherein the information age threshold specifies a threshold amount of age of information from each respective recipient vehicle.

18. The method of claim 1, further comprising:
bundling at least some of the one or more second messages based on at least a portion of the vehicle information from the one or more first messages and the characteristics associated with each respective recipient vehicle of the one or more recipient vehicles;
wherein transmitting the one or more second messages to the one or more recipient vehicles includes transmitting the bundled at least some of the one or more second messages to the one or more recipient vehicles.

19. The method of claim 18, wherein bundling at least some of the one or more second messages comprises:
bundling a plurality of messages from the one or more second messages for transmission to a recipient vehicle based on at least one of the plurality of messages being from at least one vehicle in a dynamic neighbor list of the recipient vehicle, a quality of service associated with the plurality of messages, or content of the plurality of messages.

20. The method of claim 1, wherein the one or more second messages are transmitted to the one or more recipient vehicles via a network entity.

21. The method of claim 20, wherein the network entity is a base station, the base station being one of a gNodeB (gNB) or an evolved NodeB (eNB).

22. The method of claim 20, wherein the network device and the network entity are one of remote from each other or co-located, wherein the one or more recipient vehicles are located within a communication range of the network device if the network device and the network entity are co-located or wherein the one or more recipient vehicles are located within a communication range of the network entity if the network device and the network entity are remote from each other.

23. The method of claim 1, wherein the one or more first messages are received over a wide area network (Uu) interface, and wherein the one or more second messages are transmitted over the Uu interface.

24. An apparatus for wireless communications, comprising:
  at least one memory; and
  at least one processor coupled to the at least one memory and configured to:
    receive one or more first messages from one or more vehicles remote from the apparatus, wherein each of the one or more first messages comprises vehicle information associated with each respective vehicle of the one or more vehicles;
    generate a respective dynamic neighbor list for each vehicle of the one or more vehicles based on at least a portion of the vehicle information from the one or more first messages, wherein a dynamic neighbor list for a vehicle of the one or more vehicles comprises a listing of vehicles that are located within a particular distance from the vehicle;
    determine one or more recipient vehicles for one or more second messages based on the respective dynamic neighbor list generated for each vehicle of the one or more vehicles, at least a portion of the vehicle information from the one or more first messages, and characteristics associated with a respective recipient vehicle of the one or more recipient vehicles, the one or more recipient vehicles being remote from the apparatus, wherein the one or more second messages are based on the one or more first messages, each second message of the one or more second messages including a dynamic neighbor list for at least one vehicle of the one or more recipient vehicles; and
    output the one or more second messages for transmission to the one or more recipient vehicles, wherein the one or more recipient vehicles are out of vehicle-to-everything (V2X) communication range of the one or more vehicles.

25. The apparatus of claim 24, wherein the one or more first messages and the one or more second messages are vehicular-based messages.

26. The apparatus of claim 24, wherein the one or more first messages comprise at least one of a basic safety message (BSM) or a cooperative awareness message (CAM).

27. The apparatus of claim 24, wherein the apparatus is a multi-access edge computing (MEC) device.

28. The apparatus of claim 24, wherein the vehicle information comprises at least one of a position of each respective vehicle of the one or more vehicles, an accuracy of the position, a direction of each respective vehicle, a speed of each respective vehicle, one or more capabilities of each respective vehicle, a message filtering request by each respective vehicle, or a safety warning from each respective vehicle.

29. The apparatus of claim 28, wherein the one or more capabilities comprise at least one of processing capabilities of each respective vehicle, a thermal status of each respective vehicle, or a state of health of each respective vehicle.

30. The apparatus of claim 28, wherein the safety warning comprises at least one of a do not pass warning (DNPW) or a forward collision warning (FCW).

31. The apparatus of claim 24, wherein the one or more recipient vehicles for the one or more second messages are determined further based on additional information associated with each respective recipient vehicle of the one or more recipient vehicles, the additional information comprising at least one of weather information, traffic information, lighting conditions information, road topology information, preference information, or obstructions information.

32. The apparatus of claim 24, wherein the at least one processor is configured to:
  generate a respective dynamic neighbor list for each vehicle of the one or more recipient vehicles based on at least a portion of the vehicle information from the one or more first messages and based on the characteristics associated with the one or more recipient vehicles; and
  determine the one or more recipient vehicles further based on the respective dynamic neighbor list generated for each vehicle of the one or more recipient vehicles.

33. The apparatus of claim 24, wherein the at least one processor is configured to:
  generating the respective dynamic neighbor list for each vehicle of the one or more vehicles further based on the characteristics associated with each respective recipient vehicle of the one or more recipient vehicles.

34. The apparatus of claim 24, wherein the characteristics associated with each respective recipient vehicle of the one or more recipient vehicles comprises at least one of a quality of service associated with each respective recipient vehicle of the one or more recipient vehicles or one or more performance parameters associated with the one or more recipient vehicles.

35. The apparatus of claim 34, wherein the characteristics associated with each respective recipient vehicle of the one or more recipient vehicles further comprises at least one of a position of each respective recipient vehicle, an accuracy of the position, a speed of each respective recipient vehicle, one or more capabilities of each respective recipient vehicle, a message filtering request by each respective recipient vehicle, or a safety warning from each respective recipient vehicle.

36. The apparatus of claim 35, wherein the one or more capabilities of each respective recipient vehicle comprise at least one of processing capabilities of each respective recipient vehicle, a thermal status of each respective recipient vehicle, or a state of health of each respective recipient vehicle.

37. The apparatus of claim 34, wherein the quality of service comprises a message priority, and wherein the at least one processor is configured to output the one or more second messages for transmission to at least one of the one or more recipient vehicles having a higher level of message priority before at least one other of the one or more recipient vehicles having a lower level of message priority.

38. The apparatus of claim 34, wherein the one or more performance parameters comprise at least one of an end-to-end latency threshold or an information age threshold.

39. The apparatus of claim 38, wherein the end-to-end latency threshold specifies a threshold amount of time between when the one or more second messages are transmitted and when the one or more second messages are received.

40. The apparatus of claim 38, wherein the information age threshold specifies a threshold amount of age of information from each respective recipient vehicle.

41. The apparatus of claim 24, wherein:
  the at least one processor is configured to bundle at least some of the one or more second messages based on at least a portion of the vehicle information from the one or more first messages and the characteristics associated with each respective recipient vehicle of the one or more recipient vehicles;

wherein, to output the one or more second messages for transmission to the one or more recipient vehicles, the at least one processor is configured to output the bundled at least some of the one or more second messages for transmission to the one or more recipient vehicles.

42. The apparatus of claim 41, wherein, to bundle at least some of the one or more second messages, the at least one processor is configured to:
bundle a plurality of messages from the one or more second messages for transmission to a recipient vehicle based on at least one of the plurality of messages being from at least one vehicle in a dynamic neighbor list of the recipient vehicle, a quality of service associated with the plurality of messages, or content of the plurality of messages.

43. The apparatus of claim 24, wherein the at least one processor is configured to output the one or more second messages for transmission to the one or more recipient vehicles via a network entity.

44. The apparatus of claim 43, wherein the network entity is a base station, the base station being one of a gNodeB (gNB) or an evolved NodeB (eNB).

45. The apparatus of claim 43, wherein the apparatus and the network entity are one of remote from each other or co-located, wherein the one or more recipient vehicles are located within a communication range of the apparatus if the apparatus and the network entity are co-located or wherein the one or more recipient vehicles are located within a communication range of the network entity if the apparatus and the network entity are remote from each other.

46. The apparatus of claim 24, wherein the one or more first messages are received over a wide area network (Uu) interface, and wherein the one or more second messages are transmitted over the Uu interface.

47. The apparatus of claim 24, wherein the apparatus is configured as a network entity, and further comprising:
a transceiver configured to receive the one or more first messages and transmit the one or more second messages to the one or more recipient vehicles.

* * * * *